United States Patent
Cho et al.

(10) Patent No.: US 10,923,726 B2
(45) Date of Patent: Feb. 16, 2021

(54) ARTIFICIAL SOLID ELECTROLYTE INTERPHASE OF A METALLIC ANODE FOR A SECONDARY BATTERY INCLUDING AMINO-FUNCTIONALIZED CARBON STRUCTURES TO PROTECT THE ANODE MATERIAL, A METHOD FOR PRODUCING THE ANODE AND A LITHIUM METAL SECONDARY BATTERY INCLUDING THE ANODE PRODUCED BY THE METHOD

(71) Applicant: KOREA INSTITUTE OF SCIENCE AND TECHNOLOGY, Seoul (KR)

(72) Inventors: Won Il Cho, Seoul (KR); Mun Sek Kim, Seoul (KR); Seung Hun Lee, Seoul (KR); Min Seop Kim, Seoul (KR); Van Dung Do, Seoul (KR); In Wook Nah, Seoul (KR); In Hwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 98 days.

(21) Appl. No.: 16/296,158

(22) Filed: Mar. 7, 2019

(65) Prior Publication Data

US 2019/0280304 A1    Sep. 12, 2019

(30) Foreign Application Priority Data

Mar. 8, 2018  (KR) .................. 10-2018-0027172
Mar. 14, 2018 (KR) .................. 10-2018-0029602

(51) Int. Cl.
*H01M 4/66* (2006.01)
*H01M 4/38* (2006.01)
(Continued)

(52) U.S. Cl.
CPC ............ *H01M 4/663* (2013.01); *C01B 32/174* (2017.08); *H01M 4/131* (2013.01); *H01M 4/382* (2013.01);
(Continued)

(58) Field of Classification Search
CPC ...... H01M 4/663; H01M 4/131; H01M 4/382; H01M 10/052; C01B 32/174
(Continued)

(56) References Cited

U.S. PATENT DOCUMENTS

2013/0309571 A1*  11/2013  Yoon .................. H01M 4/587
                                                    429/213
2018/0269453 A1*   9/2018  Cho .................... H01M 2/1686
(Continued)

FOREIGN PATENT DOCUMENTS

CN    104103791 A  * 10/2014
JP    2007095494 A *  4/2007
(Continued)

OTHER PUBLICATIONS

Ding Zhang et al., "Modified secondary lithium metal batteries with the polyaniline-carbon nanotube composite buffer layer", Chem. Commun., 2015, pp. 322-325, vol. 51.
(Continued)

*Primary Examiner* — Sean P Cullen
(74) *Attorney, Agent, or Firm* — Rabin & Berdo, P.C.

(57) ABSTRACT

An artificial solid electrolyte interphase (ASEI) of an anode for a secondary battery includes a first film composed of amino-functionalized, reduced graphene oxide (rGO) that is amino-functionalized by binding with polyethyleneimine present in an amount of from 1 to 50% by weight, based on total weight of the amino-functionalized, reduced graphene oxide (rGO) and that is disposed in contact with an anode material to protect the anode material; and a second film
(Continued)

comprised of amino-functionalized, multi-walled carbon nanotubes that is amino-functionalized by binding with polyethyleneimine and that is stacked on the first film. An anode of a secondary battery including the ASEI enables rapid diffusion and stable deposition of lithium to inhibit the formation of dendrites. In a secondary battery including the anode, the ASEI prevents side reactions between a lithium metal anode and the electrolyte, achieving good electrochemical stability and high Coulombic efficiency.

13 Claims, 15 Drawing Sheets

(51) Int. Cl.
*H01M 4/131* (2010.01)
*H01M 10/052* (2010.01)
*C01B 32/174* (2017.01)
*H01M 4/02* (2006.01)

(52) U.S. Cl.
CPC ....... *H01M 10/052* (2013.01); *C01B 2202/06* (2013.01); *H01M 2004/027* (2013.01); *H01M 2004/028* (2013.01); *H01M 2220/10* (2013.01); *H01M 2220/20* (2013.01); *H01M 2300/0068* (2013.01)

(58) Field of Classification Search
USPC .......................................... 429/231.8, 231.95
See application file for complete search history.

(56) References Cited

U.S. PATENT DOCUMENTS

| | | | | |
|---|---|---|---|---|
| 2018/0294513 A1* | 10/2018 | Hwang | ................. | H01M 10/44 |
| 2019/0058185 A1* | 2/2019 | Lee | ....................... | H01M 4/382 |

FOREIGN PATENT DOCUMENTS

| | | | | |
|---|---|---|---|---|
| KR | 10-2013-0128273 | A | 11/2013 | |
| KR | 10-1432915 | B1 | 8/2014 | |
| KR | 10-1486130 | B1 | 1/2015 | |
| KR | 10-2016-0086194 | A | 7/2016 | |
| KR | 10-2018-0020599 | A | 2/2018 | |
| WO | WO-2017179848 | A1 * | 10/2017 | .............. H01M 4/62 |
| WO | WO-2018034526 | A1 * | 2/2018 | ............. H01M 4/366 |

OTHER PUBLICATIONS

Lin Ma et al., "Enhanced Li-S Batteries Using Amine-Functionalized Carbon Nanotubes in the Cathode", ACS Nano, 2016, pp. 1050-1059, vol. 10.

Dingshan Yu et al., "Self-Assembled Graphene/Carbon Nanotube Hybrid Films for Supercapacitors", The Journal of Physical Chemistry Letter, 2010, pp. 467-470, vol. 1.

* cited by examiner

ARTIFICIAL SOLID ELECTROLYTE INTERPHASE OF A METALLIC ANODE FOR A SECONDARY BATTERY INCLUDING AMINO-FUNCTIONALIZED CARBON STRUCTURES TO PROTECT THE ANODE MATERIAL, A METHOD FOR PRODUCING THE ANODE AND A LITHIUM METAL SECONDARY BATTERY INCLUDING THE ANODE PRODUCED BY THE METHOD

CROSS-REFERENCE TO RELATED APPLICATIONS

This application claims priorities under 35 U.S.C. § 119 to Korean Patent Application Nos. 10-2018-0027172 and 10-2018-0029602, filed on Mar. 8, 2018 and Mar. 14, 2018, respectively in the Korean Intellectual Property Office, the disclosure of which is incorporated herein by reference in its entirety.

BACKGROUND OF THE INVENTION

1. Field of the Invention

The present invention relates to an artificial solid electrolyte interphase of an anode for a secondary battery including amino-functionalized carbon structures to protect an anode material, a method for producing an anode, and a lithium metal secondary battery including an anode produced by the method. More specifically, the present invention relates to the artificial solid electrolyte interphase of an anode for a secondary battery including amino-functionalized multi-walled carbon nanotubes or amino-functionalized reduced graphene oxide to protect an underlying anode material in the form of a foil, an anode for a lithium metal secondary battery in which an artificial solid electrolyte interphase is introduced to facilitate diffusion and migration of lithium that suppress formations of Li dendrites, and a lithium metal secondary battery using the anode in which the artificial solid electrolyte interphase prevents side reactions between a lithium metal anode and an electrolyte, achieving good electrochemical stability and high Coulombic efficiency for metallic anodes.

2. Description of the Related Art

The concept of lithium ion batteries (LiBs) was first established in 1962 and immediately lithium ion secondary batteries were proposed by M. S. Whittingham from Exxon, leading to the invention of Li—$TiS_2$ batteries. However, the company failed to commercialize battery systems including lithium metal and $TiS_2$ as an anode and a cathode, respectively, because the lithium metal (LiM) anode lacks in safety and the air/water sensitive $TiS_2$ cathode incurs a high production cost.

These problems were solved by using graphite capable of reversible intercalation and deintercalation of lithium as an anode and a lithium transition metal oxide (developed by J. O Besenhard) as a cathode, leading to the commercialization of current LiBs. The first commercial LiB was released by Sony and Asahi Kasei in 1991 and brought about a milestone in successful market expansion of portable electronic devices. Since then, the use of LiBs has increased exponentially and met the demand for electrical energy directly connected to consistent innovation of ordinary electronic devices such as cell phones, music players, speakers, drones, automobiles, and microsensors. Many researchers and scientists have investigated and studied new advanced energy materials, chemistry, and physics for stationary/mobile energy storage systems that meet the increasing demand for energy.

The recent development of commercially available LiBs has reached a saturation point. For example, only gradual improvements in the electrochemical performance of LiBs have been reported. Thus, along with the increasing demand for energy, research and development needs to be conducted on new energy materials with different morphologies and compositions. Under these circumstances, secondary batteries such as lithium-sulfur and lithium-air batteries including LiM anodes and conversion-type cathodes have received attention as next-generation batteries due to their high energy densities. Sulfur- and carbon-based air cathodes have theoretical energy densities of ~2,600 Wh/kg and ~11,400 Wh/kg, respectively, which are almost 10 times higher than that of LiBs (~360 Wh/kg for $C/LiCo_2O_4$). LiM as an anode material has a theoretical energy density as high as ~3,860 Wh/kg, a very low redox potential of −3.04 V vs. S.H.E, and a density of 0.59 g/cm$^3$. In contrast, graphite is an anode material that has a theoretical energy density as low as ~372 mAh/g and is rather high in redox potential and density. Thus, the use of a lithium anode instead of a graphite anode can contribute to a significant increase in energy density per weight of LiB. Upon successful commercialization of lithium-sulfur and lithium-air batteries in the future, LiM anodes and conversion-type cathodes are expected to meet the demand for high energy density.

Despite such advantages, several tough challenges should be addressed to commercialize batteries using LiM anodes. The most important challenge is to ensure reversible deposition and dissolution of lithium. High reactivity and non-uniform deposition of lithium cause many problems such as thermal runaway, electrolyte decomposition, and lithium loss. Non-uniform deposition of lithium during charge leads to the growth of dendrites that penetrate separators, resulting in short-circuit. This short-circuit generates much heat and sparks, causing serious safety problems giving rise to ignition of flammable electrolytes. Other problems of the LiM batteries are side reactions with electrolytes and unstable Coulombic efficiency that cause the batteries to have low capacity and poor life characteristics. This instability is caused by continuous reactions between LiM and electrolytes to destroy and form SEIs during continuous charge/discharge cycling. Such undesired processes bring about continuous degradation of electrolytes, and as a result, electrochemically inactive species are formed in the batteries, deteriorating the performance of the batteries. Therefore, there is a need to provide stable deposition positions that form stable SEIs and protect the surface of active lithium for stable deposition and dissolution of lithium. In this scenario, the formation and growth of lithium dendrites can be effectively suppressed. For this purpose, there have been made many attempts. First, Cui and co-workers at Stanford University artificially synthesized an interconnected hollow carbon sphere film (200-300 nm thick) on the surface of lithium metal to isolate the LiM from an electrolyte. The electrochemically and mechanically stable artificial SEI layer, also called "hard-film", can suppress the formation of lithium dendrites. Further, Archer and co-workers at Cornell University proposed a dendrite-free lithium anode in which LiF-coated Li reduces the growth of lithium dendrites and forms a stable SEI. Many other effective chemical additives and flexible SEI films have been proposed. However, processes for producing protective films in an economical, easy, and more effective manner still need to be developed to make LiM commercially available as an anode material.

The present inventor has found that when a solid electrolyte interphase of an anode for a secondary battery including amino-functionalized carbon structures is formed on an anode material in the form of a foil to protect the anode material, lithium can be rapidly diffused and stably deposited to inhibit the formation of dendrites in the anode. The present inventor has also found that the solid electrolyte interphase prevents side reactions between a lithium metal electrode and an electrolyte in a lithium metal secondary battery using the anode, achieving good stability and high Coulombic efficiency of the lithium metal secondary battery.

PRIOR ART DOCUMENTS

Patent Documents

Patent Document 1: Korean Patent Publication No. 10-2014-0112597
Patent Document 2: Korean Patent Publication No. 10-2014-0089450

SUMMARY OF THE INVENTION

The present invention has been made in view of the above problems, and it is an object of the present invention to provide an artificial solid electrolyte interphase of an anode for a secondary battery including amino-functionalized carbon structures to protect an underlying anode material in the form of a foil, an anode for a lithium metal secondary battery in which the artificial solid electrolyte interphase is used so that lithium can be rapidly diffused and stably deposited to inhibit the formation of dendrites, and a lithium metal secondary battery using the anode in which the solid electrolyte interphase prevents side reactions between a lithium metal and an electrolyte, achieving good electrochemical stability and high Coulombic efficiency for the metallic anode.

One aspect of the present invention provides the artificial solid electrolyte interphase (ASEI) of an anode for a secondary battery including a multi-walled carbon nanotube thin film or a reduced graphene oxide (rGO) thin film to protect the anode material.

A further aspect of the present invention provides an anode for a secondary battery including an anode material in the form of a foil and the artificial solid electrolyte interphase formed on the anode material to protect the anode material wherein the artificial solid electrolyte interphase contains multi-walled carbon nanotubes or rGO.

Another aspect of the present invention provides a secondary battery including the metallic anode.

Another aspect of the present invention provides an electric device including the anode wherein the electric device is selected from electric vehicles, hybrid electric vehicles, plug-in hybrid electric vehicles, and energy storage systems.

Yet another aspect of the present invention provides a method for producing an anode including (b) forming a polyethyleneimine-attached amino-functionalized multi-walled carbon nanotube (PEI MWCNT) thin film or a polyethyleneimine-bound amino-functionalized rGO (PEIrGO) thin film and (c) transferring the PEI MWCNT or PEIrGO thin film to the surface of the anode material in the form of a foil.

The formation of the artificial solid electrolyte interphase including amino-functionalized carbon structures on the anode material in the form of the foil enables rapid diffusion and stable deposition of lithium to suppress the formation of dendrites. In addition, the artificial solid electrolyte interphase prevents side reactions between the lithium metal anode and the electrolyte, achieving good electrochemical stability and high Coulombic efficiency for metallic anodes.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
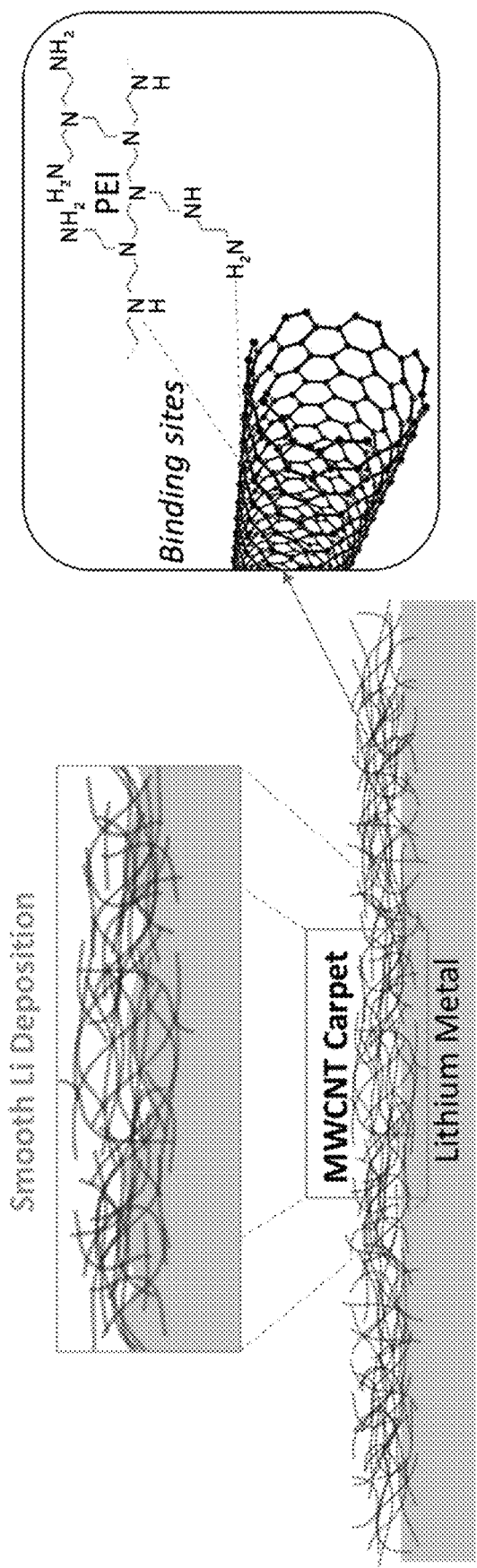
FIG. 1A is a schematic diagram of an anode produced in Example 1 in which a polyethyleneimine-attached amino-functionalized multi-walled carbon nanotube (PEI MWCNT) thin film was formed on a lithium metal electrode.

Several aspects and various embodiments of the present invention will now be described in more detail.

One aspect of the present invention is directed to the artificial solid electrolyte interphase (ASEI) of an anode for a secondary battery including multi-walled carbon nanotube thin films or a reduced graphene oxide (rGO) thin films to protect the metallic anode material.

During electrochemical cycling of a lithium metal secondary battery, highly active and flexible lithium metal (LiM) tends to induce dendritic Li electrodeposits on the LiM anode during charging due to formations of heterogeneous interphases at the anode/electrolyte interface caused by uncontrolled lithium migrations. Once the rough electrodeposits of the lithium formed on the surface of the lithium metal, lithium dendrites penetrate a separator to cause an internal short circuit. This short circuit generates heat, causing the battery to explode. Particularly, high-energy density lithium metal anode used in secondary batteries have 10 folds higher energy densities than graphite anodes in conventional lithium ion batteries. Accordingly, one of the most crucial requirements for the commercialization of lithium metal secondary batteries is to develop technologies for improving battery safety while minimizing the danger of battery explosion. Further, repeated charge/discharge cycles lead to an increase in surface area, causing degradation of electrolytes. The continuous destruction and reformation of SEI layers brings about loss of lithium (i.e. low Coulombic efficiency).

The present invention is aimed at solving the aforementioned problems. Specifically, the artificial solid electrolyte interphase of the anode for the secondary battery including the multi-walled carbon nanotube thin film or a reduced graphene oxide thin film is formed on an anode material in the form of a foil to protect the anode material. The artificial solid electrolyte interphase suppresses the formation of lithium dendrites such that the lithium metal as the anode is physicochemically stabilized and the occurrence of an internal short circuit is prevented.

According to one embodiment, the multi-walled carbon nanotubes may have a diameter of 50 to 300 nm, preferably 80 to 200 nm, more preferably 110 to 170 nm and a length of 3 to 50 μm, preferably 4 to 30 μm, more preferably 5 to 90 μm.

In the Examples section that follows, it was found that when the multi-walled carbon nanotubes are less than 50 nm in diameter or 3 μm in length, the electrochemical properties of an anode using the multi-walled carbon nanotubes deteriorated. Further, when the multi-walled carbon nanotubes were more than 300 nm in diameter or 50 μm in length, the electrochemical properties of an anode using the multi-walled carbon nanotubes deteriorated.

According to a further embodiment, the multi-walled carbon nanotubes or rGO may be an amino-functionalized one.

According to another embodiment, the amino-functionalized multi-walled carbon nanotubes or amino-functionalized rGO may be prepared by binding the multi-walled carbon nanotubes or rGO with polyethyleneimine.

Particularly, the amine groups present in the polyethyleneimine attached to the multi-walled carbon nanotubes attract lithium due to their high binding energy of lithium and allow the long and intricately interconnected fibrous carbon nanotubes having a 3-dimensional structure to assist in stably plating/dissolving the attracted lithium. The amine groups present in the polyethyleneimine bound to the rGO attract lithium due to their high binding energy of lithium and the two-dimensional structures of the graphene are stacked to form a three-dimensional network. The high conductivity of the three-dimensional network allows lithium to migrate easily, ensuring stable plating/dissolution of lithium in the lithium electrode. Therefore, the amino-functionalized multi-walled carbon nanotubes or amino-functionalized reduced graphene oxide suppresses the formation of lithium dendrites and enhances the physicochemical stability at a lithium/electrolyte interface. The formation of the functional artificial solid electrolyte interphase ensures continuous plating and dissolution of lithium in the lithium electrode for a prolonged period of time and achieves good electrochemical stability and high Coulombic efficiency.

According to another embodiment, the polyethyleneimine may be present in an amount ranging from 0.1 to 10% by weight, based on the total weight of the amino-functionalized multi-walled carbon nanotubes, and the polyethyleneimine may be present in an amount ranging from 1 to 50% by weight, based on the total weight of the amino-functionalized rGO.

Outside each range, satisfactory electrochemical properties of an anode cannot be expected.

According to another embodiment, the solid electrolyte interphase may further include a multi-walled carbon nanotube thin film stacked on the rGO thin film.

According to another embodiment, the multi-walled carbon nanotubes may be polyethyleneimine-attached amino-functionalized ones (PEI MWCNTs).

The PEI MWCNTs form a buffer layer through which the rGO thin film or PEIrGO thin film can be uniformly transferred to the surface of the lithium metal. The buffer layer can assist in easily peeling off a filter paper to which the rGO or PEIrGO adheres well when the rGO or PEIrGO is transferred to the lithium.

Particularly, although not explicitly described in the Examples section that follows, the artificial solid electrolyte interphases of anodes for secondary batteries including multi-walled carbon nanotubes to protect anode materials were formed by varying the diameter and length of the multi-walled carbon nanotubes and conditions for amino functionalization of the multi-walled carbon nanotubes, the artificial solid electrolyte interphases were applied to anodes for lithium metal secondary batteries, lithium metal secondary batteries fabricated using the anodes were operated at high temperature for 500 hours, and then the cross-sections of the anodes were observed and losses of the multi-walled carbon nanotubes were investigated by scanning electron microscopy (SEM).

As a result, when the following conditions were met, no voids were formed at the interfaces between the lithium metal and the artificial solid electrolyte interphases and no losses of the multi-walled carbon nanotubes coated on the lithium metal were found even after the lithium metal secondary batteries were operated at high temperature for 500 hours, unlike when other conditions and other numerical ranges were employed: (i) the multi-walled carbon nanotubes had a diameter of 50 to 300 nm; (ii) the multi-walled carbon nanotubes had a length of 3 to 50 μm; (iii) the multi-walled carbon nanotubes were amino-functionalized by binding with polyethyleneimine; and (iv) the polyethyleneimine was present in an amount of 0.1 to 10% by weight, based on the total weight of the amino-functionalized multi-walled carbon nanotubes.

When any one of the above conditions was not met, voids were formed in many portions of the interfaces between the lithium metal and the artificial solid electrolyte interphases and considerable losses of the multi-walled carbon nanotubes coated on the lithium metal electrodes were found after the lithium metal secondary batteries were operated at high temperature for 500 hours.

Although not explicitly described in the Examples section that follows, the artificial solid electrolyte interphases of anodes for secondary batteries including reduced graphene oxide thin films to protect anode materials were formed by varying the conditions for amino functionalization and with or without additional thin films stacked on the reduced graphene oxide thin films, the artificial solid electrolyte interphases were applied to anodes for lithium metal secondary batteries, lithium metal secondary batteries fabricated using the anodes were operated at high temperature for 500 hours, and then the cross-sections of the anodes were observed and losses of the reduced graphene oxide thin films were investigated by scanning electron microscopy (SEM).

As a result, when the following conditions were met, no voids were formed at the interfaces between the lithium metal and the artificial solid electrolyte interphases and no losses of the reduced graphene oxide thin films coated on the lithium metal were found even after the lithium metal secondary batteries were operated at high temperature for 500 hours, unlike when other conditions and other numerical ranges were employed: (i) the rGO was amino-functionalized by binding with polyethyleneimine; (ii) the polyethyleneimine was present in an amount of 1 to 50% by weight, based on the total weight of the amino-functionalized rGO; (iii) the artificial solid electrolyte interphases further included multi-walled carbon nanotube thin films stacked on the rGO thin films; and (iv) the multi-walled carbon nanotubes were amino-functionalized by binding with polyethyleneimine.

When any one of the above conditions was not met, voids were formed in many portions of the interfaces between the lithium metal and the artificial solid electrolyte interphases and considerable losses of the reduced graphene oxide thin films coated on the lithium metal electrodes were found after the lithium metal secondary batteries were operated at high temperature for 500 hours.

A further aspect of the present invention is directed to an anode including an anode material in the form of a foil and a solid electrolyte interphase formed on the anode material to protect the anode material wherein the artificial solid electrolyte interphase contains multi-walled carbon nanotubes or rGO.

Only lithium is illustrated as the anode material in the drawings. However, it should be understood that various metals such as magnesium, sodium, potassium, and aluminum may be used as anode materials of secondary batteries. Preferably, the anode material foil is a lithium foil.

Another aspect of the present invention is directed to a secondary battery including the anode.

The secondary battery may be selected from lithium metal secondary batteries, lithium-sulfur batteries, lithium-air batteries, lithium ion batteries, magnesium ion batteries, sodium ion batteries, potassium ion batteries, and aluminum ion batteries. Preferably, the secondary battery is a lithium metal secondary battery.

According to a further embodiment, a cathode of the secondary battery may include at least one compound selected from lithium cobalt oxides, lithium manganese oxides, lithium nickel cobalt aluminum oxides, lithium nickel manganese cobalt oxides, lithium iron phosphate oxide, and sulfur compounds or may be a porous air electrode.

Another aspect of the present invention is directed to an electric device including the anode wherein the electric device is selected from electric vehicles, hybrid electric vehicles, plug-in hybrid electric vehicles, and energy storage systems.

Yet another aspect of the present invention is directed to a method for producing an anode including (b) forming a polyethyleneimine-attached amino-functionalized multi-walled carbon nanotube (PEI MWCNT) thin film or a polyethyleneimine-bound amino-functionalized rGO (PEIrGO) thin film and (c) transferring the PEI MWCNT or PEIrGO thin film to the surface of an anode material in the form of a foil.

According to one embodiment, in step (b), a suspension of PEI MWCNTs or PEIrGO may be coated on a substrate to form a PEI MWCNT thin film or a PEIrGO thin film by a technique selected from vacuum filtration, Langmuir-Blodgett scooping (LBS), tape casting, electrospinning, spin coating, spray coating, and flat rolling. There is no restriction on the technique for forming the PEI MWCNT thin film. Preferably, the thin film is formed on a filter paper as the substrate by vacuum filtration.

Langmuir-Blodgett scooping (LBS) refers to a process for forming a thin film based on self-assembly of film-forming particles, diffusion of a water-immiscible solvent, and the surface tension gradient known as the "Marangoni effect". When a suspension of film-forming particles in ethanol or isopropanol as a suspension medium is injected into the surface of water, the suspension is rapidly diffused on the water surface while interacting with the water surface, lowering the surface tension of the water. As a result, the particles slip and self-assemble. This self-assembly leads to the formation of a uniform film on the water surface during injection of the suspension.

According to a further embodiment, the method may further include drying the thin film obtained by vacuum filtration at 30 to 150° C. for 12 to 36 hours.

According to a further embodiment, in step (b), the PEIrGO thin film is formed on a polyethyleneimine-bound amino-functionalized multi-walled carbon nanotube (PEI MWCNT) thin film.

According to another embodiment, step (b) may include (A) applying a suspension containing PEI MWCNTs to a filter paper, followed by vacuum filtration to form a PEI MWCNT thin film on the filter paper and (B) applying a suspension containing PEIrGO to the filter paper on which the PEI MWCNT thin film is formed, followed by vacuum filtration to form a PEIrGO thin film on the PEI MWCNT thin film.

According to another embodiment, the method may further include drying the PEIrGO thin film formed on the PEI MWCNT thin film by vacuum filtration at 30 to 150° C. for 12 to 36 hours.

According to another embodiment, the method may further include, prior to step (b), (a) mixing multi-walled carbon nanotubes with polyethyleneimine in a weight ratio of 1:0.1-5, preferably 1:0.5-3, more preferably 1:1-2 and allowing the mixture to react at 50 to 150° C., preferably 60 to 130° C., more preferably 80 to 100° C. for 12 to 36 hours, preferably 18 to 30 hours, more preferably 22 to 26 hours to obtain polyethyleneimine-attached amino-functionalized multi-walled carbon nanotubes.

Particularly, in the Examples section that follows, it was found that when the weight ratio and the reaction temperature and time were within the preferred ranges defined above, the largest possible amount of the polyethyleneimine was attached to the multi-walled carbon nanotubes.

According to another embodiment, the method may further include, prior to step (b), ((a)-I) mixing rGO with polyethyleneimine in a weight ratio of 1:0.1-5, preferably 1:0.5-3, more preferably 1:1-2 and allowing the mixture to react at 50 to 150° C., preferably 60 to 130° C., more preferably 80 to 100° C. for 12 to 36 hours, preferably 18 to 30 hours, more preferably 22 to 26 hours to obtain polyethyleneimine-bound amino-functionalized rGO (PEIrGO) and ((a)-II) mixing multi-walled carbon nanotubes with polyethyleneimine in a weight ratio of 1:0.1-5, preferably 1:0.5-3, more preferably 1:1-2 and allowing the mixture to react at 50 to 150° C., preferably 60 to 130° C., more preferably 80 to 100° C. for 12 to 36 hours, preferably 18 to 30 hours, more preferably 22 to 26 hours to obtain polyethyleneimine-attached amino-functionalized multi-walled carbon nanotubes (PEI MWCNTs).

Particularly, in the Examples section that follows, it was found that when the weight ratio and the reaction temperature and time were within the preferred ranges defined above, the largest possible amount of the polyethyleneimine was attached to the rGO and multi-walled carbon nanotubes.

According to another embodiment, step (c) may be carried out by transferring the polyethyleneimine-attached amino-functionalized multi-walled carbon nanotube thin films to the surface of lithium metal. The polyethyleneimine-attached amino-functionalized multi-walled carbon nanotube thin film, the PEIrGO thin film or the PEIrGO thin film formed on the PEI MWCNT thin film to the surface of lithium metal. The thin film may be provided in plurality.

According to another embodiment, step (c) may be carried out by rolling.

According to another embodiment, in step (c), the lithium metal and the filter paper may be pressed against each other such that the lithium metal is close to the polyethyleneimine-attached amino-functionalized multi-walled carbon nanotube thin film, the PEIrGO thin film or the PEIrGO thin film formed on the PEI MWCNT thin film.

According to another embodiment, the lithium metal and the filter paper may be pressed against each other by sandwiching the lithium metal and the filter paper close to each other between a pair of protective films and passing the sandwich structure through a rolling mill.

According to another embodiment, roll cylinders of the rolling mill may be arranged at an interval corresponding to 50 to 90% of the total thickness of all layers inserted therebetween and the rolling speed of the rolling mill may be maintained at 0.05 to 0.2 cm/sec.

According to another embodiment, step (c) may further include removing the filter paper from the lithium metal to which the polyethyleneimine-attached amino-functionalized multi-walled carbon nanotube thin film, the PEIrGO thin film or the PEIrGO thin film formed on the PEI MWCNT thin film is transferred.

According to another embodiment, step (c) may be carried out in a dry atmosphere at a relative humidity of 0% to 1%. If the relative humidity exceeds the upper limit defined above, the lithium metal may be oxidized, impairing the electrochemical properties of the anode.

According to another embodiment, step (c) may be carried out in an atmosphere of at least one inert gas selected from argon, nitrogen, helium, and neon to prevent the oxidation and side reactions of the lithium metal.

According to another embodiment, the filter paper may be Celgard® 2500 or a polyethylene, polypropylene or polyolefin separator. The filter paper is not limited but is preferably Celgard® 2500.

According to another embodiment, the protective films may be polyester or polycarbonate films. The protective films are not limited but are preferably polyester films.

Particularly, although not explicitly described in the Examples section that follows, anodes for lithium metal secondary batteries in which artificial solid electrolyte interphases including multi-walled carbon nanotubes are formed to protect the anode materials were produced by varying the conditions defined in steps (b) and (c), lithium metal secondary batteries fabricated using the anodes were operated at a high temperature of 800° C. or above, and the morphologies of the anodes were observed by scanning electron microscopy (SEM).

As a result, when the following conditions were met, no aggregation of the polyethyleneimine-attached amino-functionalized multi-walled carbon nanotube particles coated on the anode material foils was observed even after the lithium metal secondary batteries were operated at high temperature for 800 hours, demonstrating excellent thermal stability of the secondary batteries, unlike when other conditions and other numerical ranges were employed: (i) the thin film obtained by vacuum filtration was dried at 30 to 150° C. for 12 to 36 hours; (ii) the polyethyleneimine-attached amino-functionalized multi-walled carbon nanotubes were prepared by mixing multi-walled carbon nanotubes with polyethyleneimine in a weight ratio of 1:1-2 and allowing the mixture to react at 80 to 100° C. for 22 to 26 hours; (iii) a lithium foil was used as the anode material foil; (iv) step (c) was carried out by rolling, (v) roll cylinders of the rolling mill were arranged at an interval corresponding to 50 to 90% of the total thickness of all layers inserted therebetween; (vi) the rolling speed of the rolling mill were maintained at 0.05 to 0.2 cm/sec; (vii) step (c) was carried out in a dry atmosphere at a relative humidity of 0% to 1%; (viii) Celgard® 2500 was used as the filter paper; and (ix) polyester films was used as the protective films.

When any one of the above conditions was not met, considerable aggregation of the polyethyleneimine-attached amino-functionalized multi-walled carbon nanotube particles coated on the lithium metal was observed after the lithium metal secondary batteries were operated at high temperature for 800 hours.

Particularly, although not explicitly described in the Examples section that follows, anodes for lithium metal secondary batteries containing artificial solid electrolyte interphases in which PEIrGO thin films were formed on PEI MWCNT thin films to protect the anode materials were produced by varying the conditions defined in steps (b) and (c), lithium metal secondary batteries fabricated using the anodes were operated at a high temperature of 800° C. or above, and the morphologies of the anodes were observed by scanning electron microscopy (SEM).

As a result, when the following conditions were met, no aggregation of the polyethyleneimine-bound amino-functionalized reduced graphene oxide (PEIrGO) particles coated on the anode material foils was observed even after the lithium metal secondary batteries were operated at high temperature for 800 hours, demonstrating excellent thermal stability of the secondary batteries, unlike when other conditions and other numerical ranges were employed: (i) in step (b), (A) a suspension containing PEI MWCNTs was applied to a filter paper, followed by vacuum filtration to form a PEI MWCNT thin film on the filter paper and (B) a suspension containing PEIrGO was applied to the filter paper on which the PEI MWCNT thin film was formed, followed by vacuum filtration to form a PEIrGO thin film on the PEI MWCNT thin film; (ii) the PEIrGO thin film formed on the PEI MWCNT thin film by vacuum filtration was dried at 30 to 150° C. for 12 to 36 hours; (iii) the polyethyleneimine-bound amino-functionalized rGO was prepared by mixing rGO with polyethyleneimine in a weight ratio of 1:1-2 and allowing the mixture to react at 80 to 100° C. for 22 to 26 hours; (iv) the polyethyleneimine-bound amino-functionalized multi-walled carbon nanotubes were prepared by mixing multi-walled carbon nanotubes with polyethyleneimine in a weight ratio of 1:1-2 and allowing the mixture to react at 80 to 100° C. for 22 to 26 hours; (v) a lithium foil was used as the anode material foil; (vi) step (c) was carried out by rolling, (vii) roll cylinders of the rolling mill were arranged at an interval corresponding to 50 to 90% of the total thickness of all layers inserted therebetween; (viii) the rolling speed of the rolling mill were maintained at 0.05 to 0.2 cm/sec; (ix) step (c) was carried out in a dry atmosphere at a relative humidity of 0% to 1%; (x) a polyolefin separator was used as the filter paper; and (xi) polyester films was used as the protective films.

When any one of the above conditions was not met, considerable aggregation of the PEIrGO particles coated on the lithium metal was observed after the lithium metal secondary batteries were operated at high temperature for 800 hours.

The present invention will be explained in detail with reference with the following examples in conjunction with the accompanying drawings.

Example 1: Production of Lithium Metal Electrode on which Polyethyleneimine-Attached Amino-Functionalized Multi-Walled Carbon Nanotube Thin Film was Formed (1) Preparation of Polyethyleneimine-Attached Amino-Functionalized Multi-Walled Carbon Nanotube (PEI MWCNT) Thin Film 1 g of commercial MWCNTs (diameter: 110-170 nm, length: 5-9 μm) were allowed to react with 1.5 g of polyethyleneimine (average Mw: ~60,000 (LS), average Mn: ~750,000 (GPC), branched) in deionized water with stirring at 90° C. for 24 h. The reaction mixture was cooled to room temperature, centrifuged 10 times, and washed to obtain polyethyleneimine-bound amino-functionalized multi-walled carbon nanotubes ("PEI MWCNTs").

3 mg of the PEI MWCNT nanoparticles were dissolved in 30 mL of ethanol to prepare a suspension. Thereafter, the suspension was formed into a PEI MWCNT thin film by vacuum filtration using a separator (Celgard® 2500) filter paper. The thin film was dried in an oven at 60° C. for 1 day.

(2) Transfer of the Thin Film to Lithium Metal Electrode

The PEI MWCNT thin film formed on the Celgard® 2500 filter paper was transferred to the surface of lithium metal using a rolling mill. Specifically, under dry environmental conditions, lithium metal and the PEI MWCNT thin film were sandwiched between Mylar films (polyester films) and the sandwich structure was uniformly pressurized in a rolling mill. The interval between rolls of the rolling mill was adjusted to 0.1 mm (corresponding to 70% of the total thickness of all layers inserted between the rolls) and the rolling speed of the rolling mill was maintained at 0.1 cm/sec. Thereafter, the Mylar films were removed, the filter paper attached to the lithium metal was peeled off, and then the electrochemical properties of the PEI MWCNT thin film-transferred lithium metal were measured. The entire procedure was carried out in a dry atmosphere at a relative humidity of 0-1% and an inert gas atmosphere.

Example 2: Production of Lithium Metal Electrode on which Polyethyleneimine-Bound Amino-Functionalized Reduced Graphene Oxide (rGO) was Formed (1) Material Synthesis First, graphite flakes were dispersed in concentrated sulfuric acid and cooled to 0° C. Then, 5 g of a potassium permanganate solution was added dropwise to the dispersion while preventing the temperature from exceeding 10° C., and distilled water and aqueous hydrogen peroxide were added thereto. The resulting solution was filtered several times with deionized water to obtain graphene oxide. The graphene oxide powder was treated with hydrogen gas in a tube furnace at 800° C. for 120 min while feeding the hydrogen gas at a flow rate of 100 sccm and was allowed to cool to room temperature to obtain reduced graphene oxide. The reduced graphene oxide was sufficiently dispersed in water to attach PEI thereto. To this end, 400 mg of the reduced graphene oxide was added to 500 ml of distilled water and was then sufficiently dispersed by sonication for 30 min The dispersion was added with 0.5 g of polyethyleneimine (average Mw ~60,000 (LS), average Mn ~750,000 (GPC), branched). The resulting solution was kept in a thermostatic oil bath at 90° C. for 24 h with stirring, cooled to room temperature, and washed ten times with deionized water by centrifugation to synthesize polyethyleneimine-bound amino-functionalized rGO.

Next, 1 g of MWCNTs (diameter: 110-170 nm, length: 5-9 μm) were allowed to react with 1 g of polyethyleneimine (average Mw ~60,000 (LS), average Mn ~750,000 (GPC), branched) in deionized water at 90° C. for 24 h. The reaction mixture was cooled to room temperature and washed 10 times by centrifugation to synthesize polyethyleneimine-attached amino-functionalized multi-walled carbon nanotubes (PEI MWCNTs).

(2) Thin Film Formation 1 g of the PEI MWCNT nanoparticles were dissolved in 30 mL of ethanol to prepare a suspension. Thereafter, the suspension was applied to a separator (Celgard® 2500, Nafion-coated polypropylene separator) filter paper, followed by vacuum filtration to form a PEI MWCNT thin film on the filter paper.

Subsequently, 2 mg of PEIrGO nanoparticles were dissolved in 30 mL of ethanol to prepare a suspension. Thereafter, the suspension was applied to the PEI MWCNT thin film formed on the filter paper, followed by vacuum filtration to form a PEIrGO thin film on the PEI MWCNT thin film. The resulting thin film was dried in an oven at 60° C. for 1 day.

(3) Transfer of the Thin Film to Lithium Metal Electrode

The PEIrGO thin film was transferred from the PEI MWCNT thin film formed on the Celgard® 2500 filter paper to the surface of lithium metal using a rolling mill. Specifically, under dry environmental conditions, lithium metal and the PEIrGO thin film were sandwiched between Mylar films (polyester films) and the sandwich structure was uniformly pressurized in a rolling mill. The interval between rolls of the rolling mill was adjusted to 0.1 mm (corresponding to 70% of the total thickness of all layers inserted between the rolls) and the rolling speed of the rolling mill was maintained at 0.1 cm/sec. Thereafter, the Mylar films were removed, the filter paper attached to the lithium metal was peeled off, and then the electrochemical properties of the lithium metal to which the PEIrGO thin film was transferred from the PEI MWCNT thin film were measured. The entire procedure was carried out in a dry atmosphere at a relative humidity of 0-1% and an inert gas atmosphere.

Comparative Example 1: Pristine Lithium Metal Electrode

A pristine lithium metal electrode ("Pristine Li") without a PEI MWCNT thin film was prepared.

Comparative Example 2: Lithium Metal Electrode Using Thin and Small MWCNTs 3 mg of MWCNT nanoparticles (diameter: 9.5 nm, length: 1.5 μm) were dissolved in 30 mL of ethanol to prepare a suspension. Thereafter, the suspension was formed into a thin film by vacuum filtration using a separator (Celgard® 2500) filter paper. The thin film was dried in an oven at 60° C. for 1 day.

Thereafter, a lithium metal electrode was produced in the same manner as in (2) of Example 1.

Figure 1B:
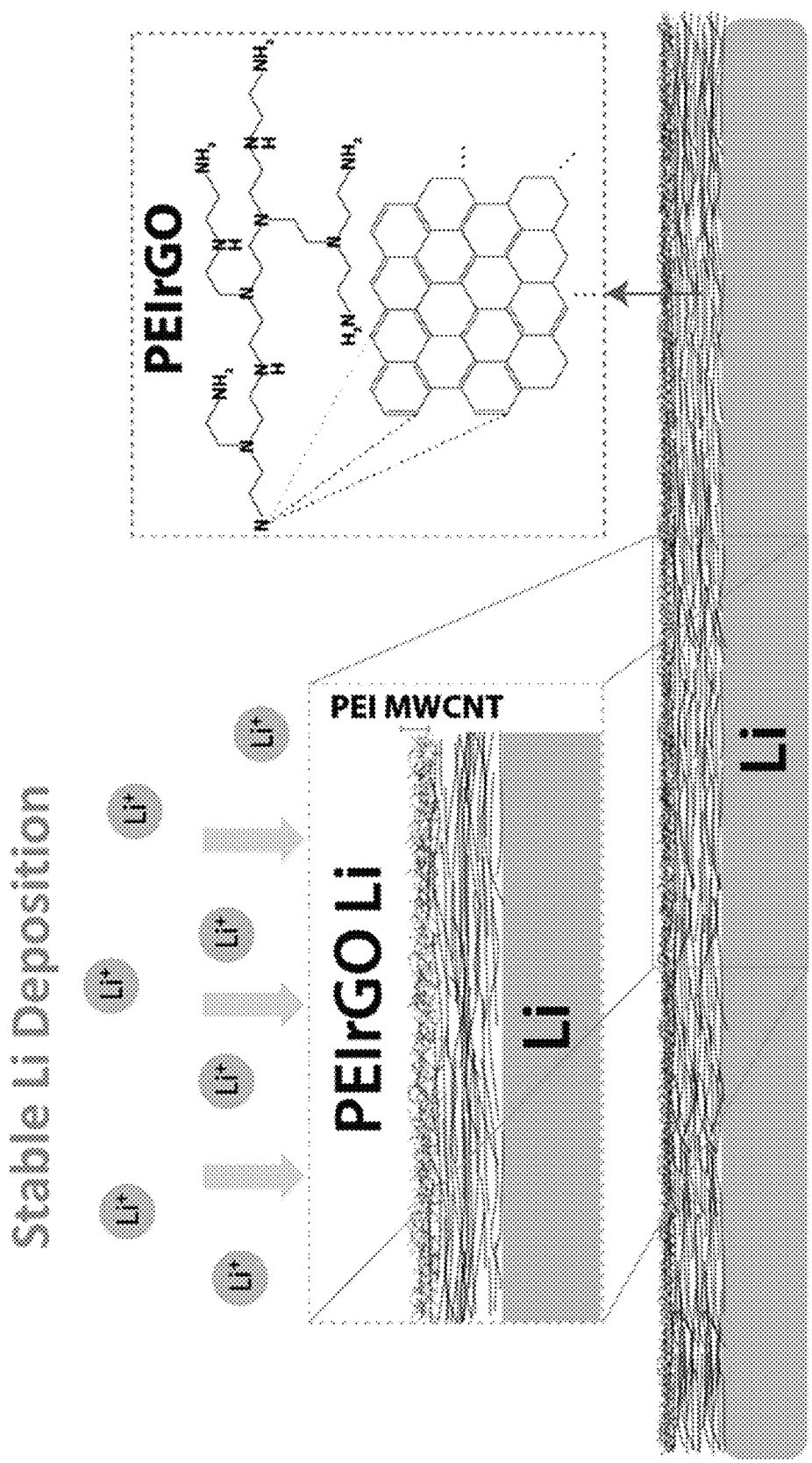
FIG. 1B is a schematic diagram of an anode produced in Example 2 in which a polyethyleneimine-bound amino-functionalized reduced graphene oxide (PEIrGO) thin film was formed on a lithium metal electrode.

FIG. 1A is a schematic diagram of the anode produced in Example 1 in which the polyethyleneimine-attached amino-functionalized multi-walled carbon nanotube (PEI MWCNT) thin film was formed on the lithium metal electrode. FIG. 1B is a schematic diagram of the anode produced in Example 2 in which the polyethyleneimine-bound amino-functionalized reduced graphene oxide (PEIrGO) thin film was formed on the lithium metal electrode.

As shown in FIGS. 1a and 1b, lithium was uniformly plated through the artificial solid electrolyte interphase based on the PEI-attached MWCNTs or rGO. The amine groups abundantly present in the PEI are functional groups that attract lithium due to their polarity. The amine groups attracting lithium greatly stabilize the migration, plating, and dissolution of the lithium through the highly conductive, long and intricate layered structure and three-dimensional network of the MWCNTs or rGO.

Figure 2A:
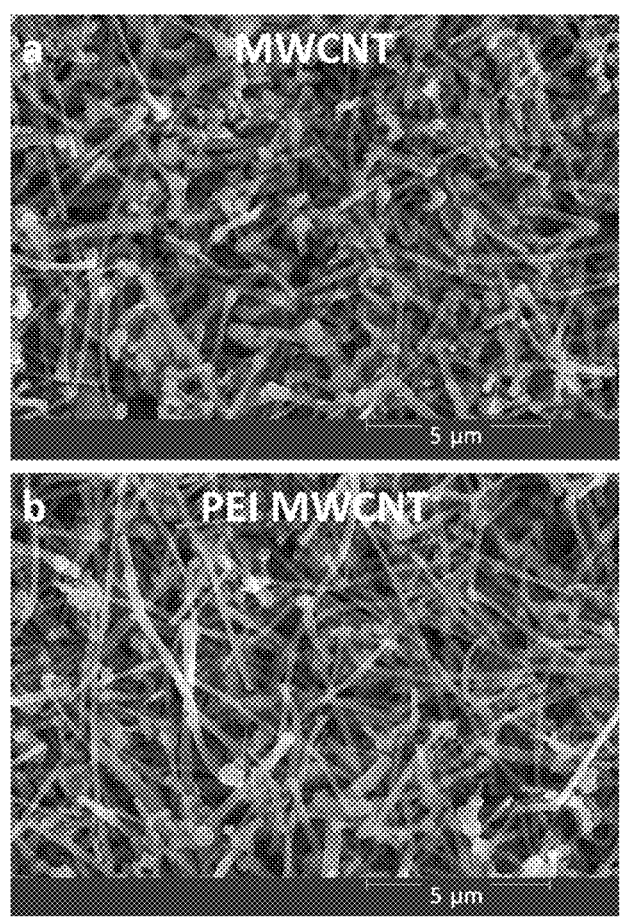
FIG. 2A shows scanning electron microscopy (SEM) images of (a) multi-walled carbon nanotubes (MWCNTs) used in Example 1 and (b) PEI MWCNTs prepared in Example 1.
Figure 2B:
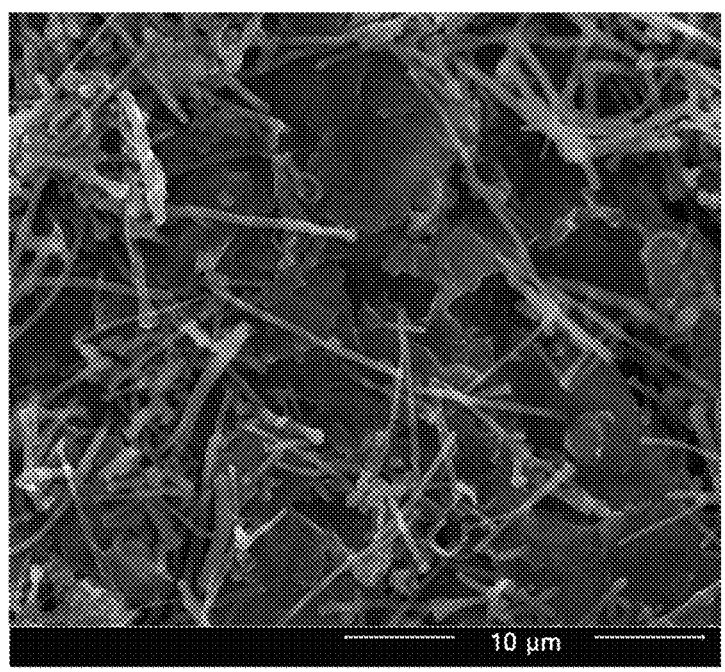
FIG. 2B is a scanning electron microscopy (SEM) image showing the surface profile of a lithium metal electrode (PEIrGO Li) prepared in Example 2.

FIG. 2A shows scanning electron microscopy (SEM) images of the multi-walled carbon nanotubes (MWCNTs) used in Example 1 (a) and the PEI MWCNTs prepared in Example 1 (b). FIG. 2B is a scanning electron microscopy (SEM) image showing the surface profile of the lithium metal electrode (PEIrGO Li) prepared in Example 2.

Referring to FIG. 2A, the structure of the MWCNTs was almost completely conserved even after attachment of the PEI.

FIG. 2B shows the formation of the uppermost thin PEI MWCNT layer and the presence of the underlying PEIrGO. The PEI MWCNTs form a buffer layer through which the PEIrGO can be uniformly transferred to the surface of the lithium metal. The buffer layer can assist in easily peeling off the filter paper to which the PEIrGO adheres well when the PEIrGO is transferred to the lithium.

Figure 3:
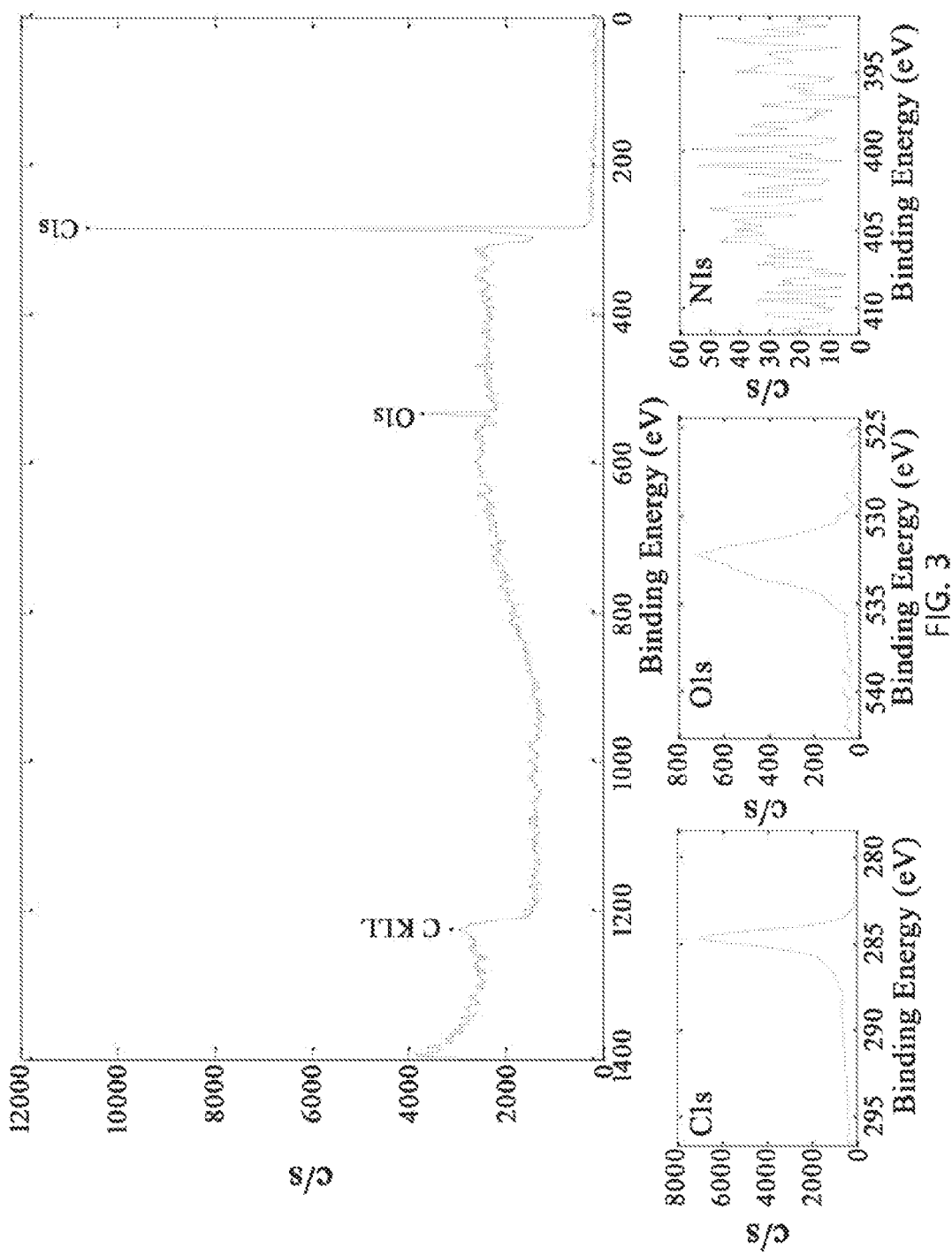
FIG. 3 shows X-ray photoelectron spectra (XPS) of reduced graphene oxide (rGO) synthesized in Example 2.

FIG. 3 shows X-ray photoelectron spectra (XPS) of the reduced graphene oxide (rGO) synthesized in Example 2.

Referring to FIG. 3, binding points for C and O of the rGO were clearly observed as expected. Binding points for N were not observed due to the absence of amine groups (i.e. N binding points).

Figure 4:
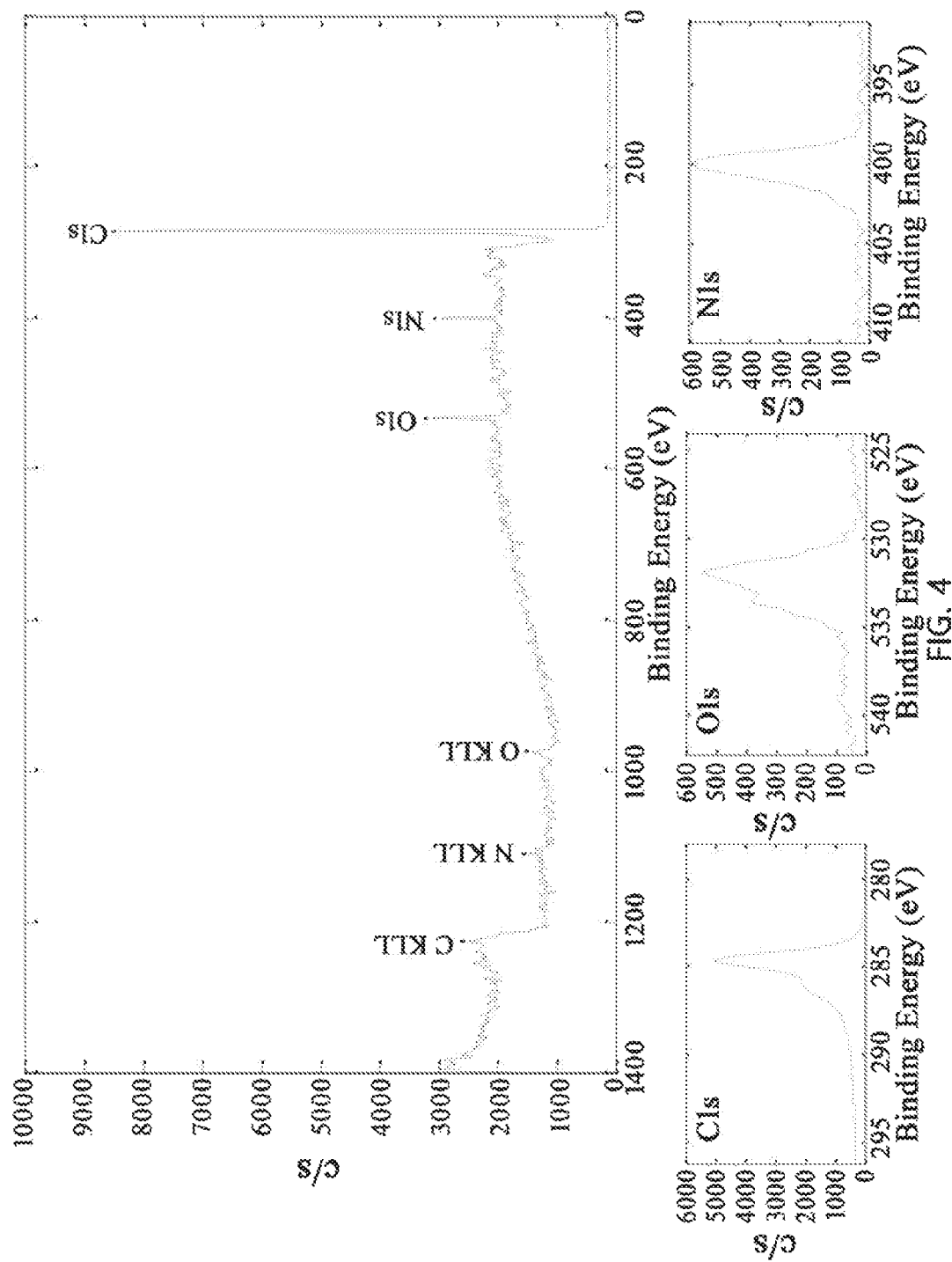
FIG. 4 shows X-ray photoelectron spectra (XPS) of polyethyleneimine-bound amino-functionalized rGO (PEIrGO) synthesized in Example 2.

FIG. 4 shows X-ray photoelectron spectra (XPS) of the polyethyleneimine-bound amino-functionalized rGO (PEIrGO) synthesized in Example 2;

Referring to FIG. 4, binding points for C, O, and N of the PEIrGO were clearly observed as expected. N binding points were also clearly observed, indicating the attachment of the PEI to the graphene.

Figure 5A:
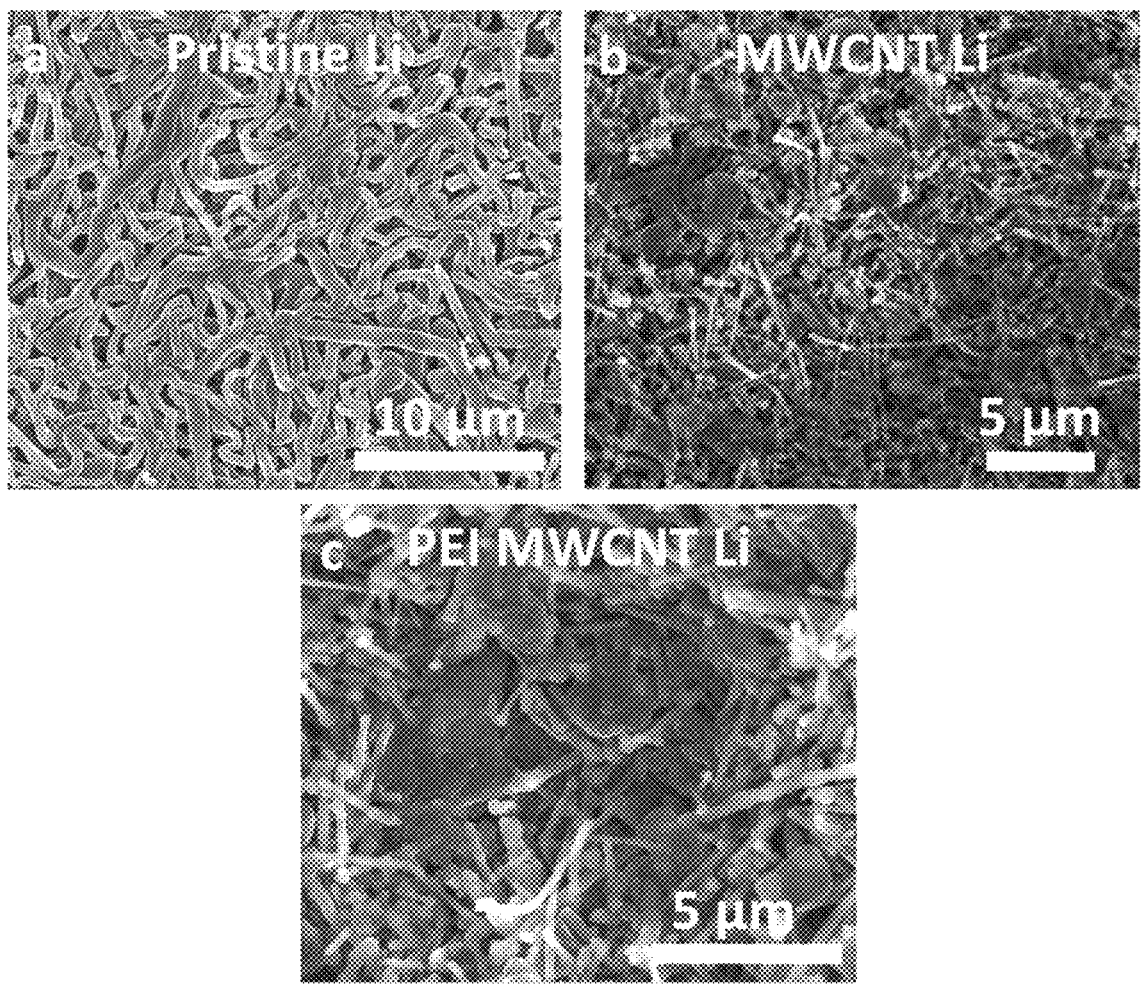
FIG. 5A shows scanning electron microscopy (SEM) images showing the surface morphologies of (a) pristine lithium metal of Comparative Example 1 ("Pristine Li"), (b) an electrode in which a thin film of MWCNTs used in Example 1 was formed on lithium metal ("MWCNT Li"), and (c) an electrode of Example 1 in which a PEI MWCNT thin film was formed on lithium metal ("PEI MWCNT Li")

FIG. 5A shows scanning electron microscopy (SEM) images showing the surface morphologies of the pristine lithium metal of Comparative Example 1 ("Pristine Li") (a), the electrode in which the MWCNT thin film used in Example 1 was formed on lithium metal ("MWCNT Li") (b), and the electrode of Example 1 in which the PEI MWCNT thin film was formed on lithium metal ("PEI MWCNT Li") (c).

Referring to (a) of FIG. 5A, lithium dendrites were formed in the anode using the pristine lithium owing to the instability of the lithium surface. (b) of FIG. 5A reveals that the formation and diffusion of dendrites was less observed in the lithium anode in which the artificial solid electrolyte interphase based on the MWCNTs having a three-dimensional structure was formed. (c) of FIG. 5A reveals that lithium was more smoothly plated in the lithium anode including an artificial solid electrolyte interphase based on the PEI-functionalized MWCNTs, resulting in more stable migration and plating of the lithium than in the lithium anode based on the MWCNTs.

Figure 5B:
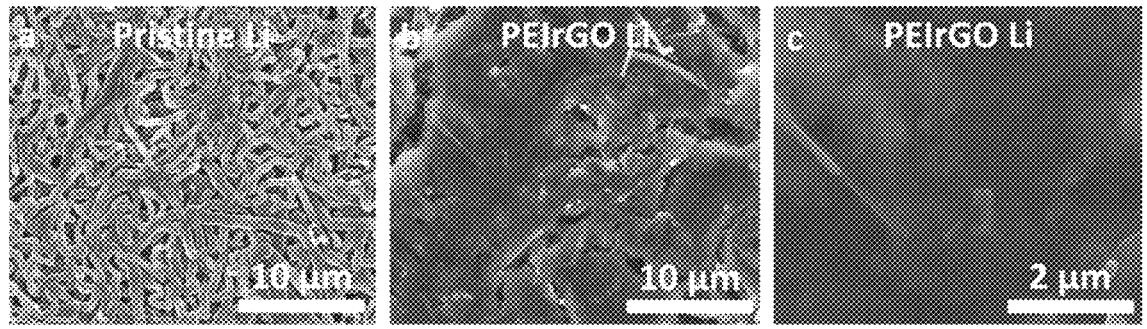
FIG. 5B shows scanning electron microscopy (SEM) images showing the surface morphologies of (a) pristine lithium metal of Comparative Example 1 ("Pristine Li") and (b) a lithium metal electrode (PEIrGO Li) produced in Example 2 after electrochemical cycles, and (c) a higher magnification image of (b)

FIG. 5B shows scanning electron microscopy (SEM) images showing the surface morphologies of the pristine lithium metal of Comparative Example 1 ("Pristine Li") (a) and the lithium metal electrode (PEIrGO Li) produced in Example 2 after electrochemical cycles (b). (c) of FIG. 5B is a higher magnification image of (b);

Referring to FIG. 5B, lithium dendrites were formed in the anode using the pristine lithium (Pristine Li) (a) owing to the instability of the lithium surface. In contrast, the formation and diffusion of dendrites was less observed in the lithium anode in which an artificial solid electrolyte interphase based on the PEIrGO having a three-dimensional structure was formed (b). The higher magnification image (c) shows smooth plating of lithium. In conclusion, more stable migration, plating, and dissolution of lithium was achieved in the electrode including the PEIrGO thin film than in the pristine Li anode.

Figure 6:
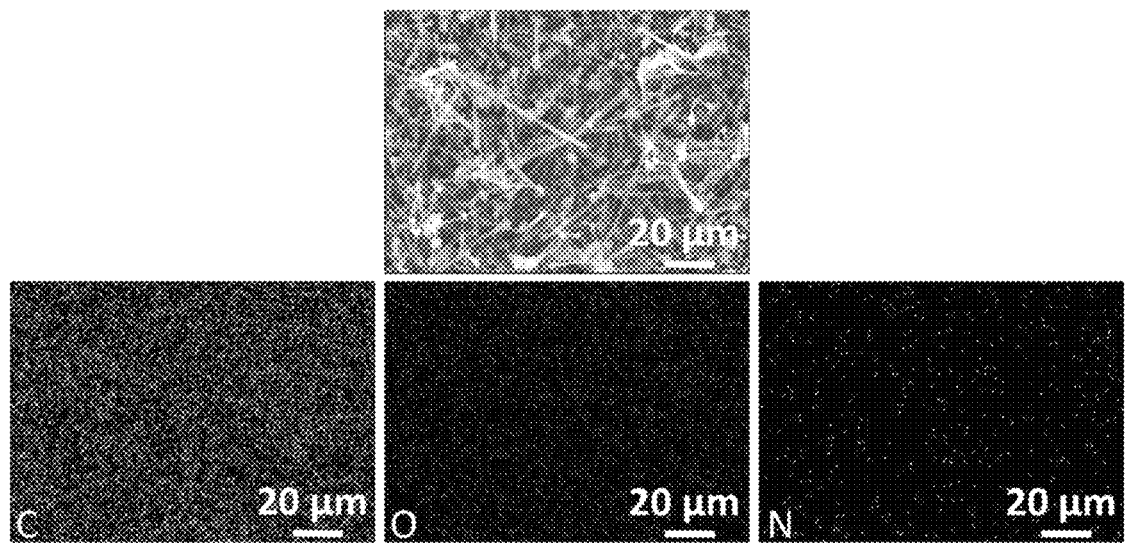
FIG. 6 shows a scanning electron microscopy (SEM) image and EDXS elemental mapping images of PEI MWCNTs prepared in Example 1.

FIG. 6 shows a scanning electron microscopy (SEM) image and EDXS elemental mapping images of the PEI MWCNTs prepared in Example 1.

Referring to FIG. 6, the PEI MWCNTs were primarily composed of C and O and the presence of N resulting from the attachment of PEI was confirmed.

Figure 7A:
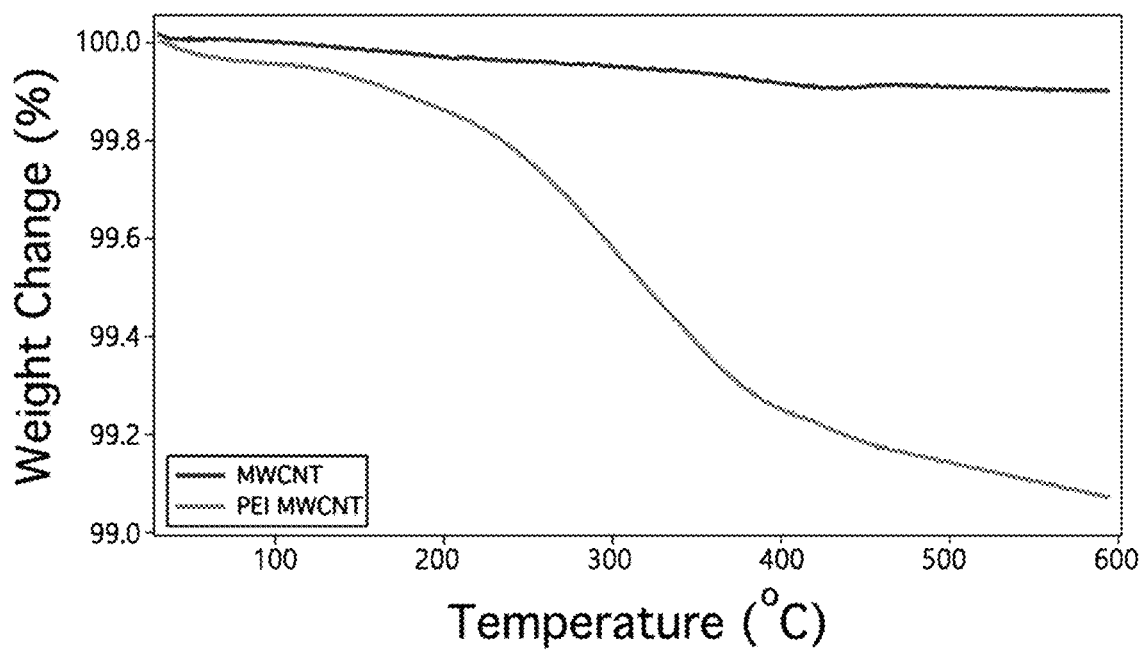
FIG. 7A shows a change in the weight of PEI by thermogravimetric analysis (TGA) of PEI MWCNTs prepared in Example 1.
Figure 7B:
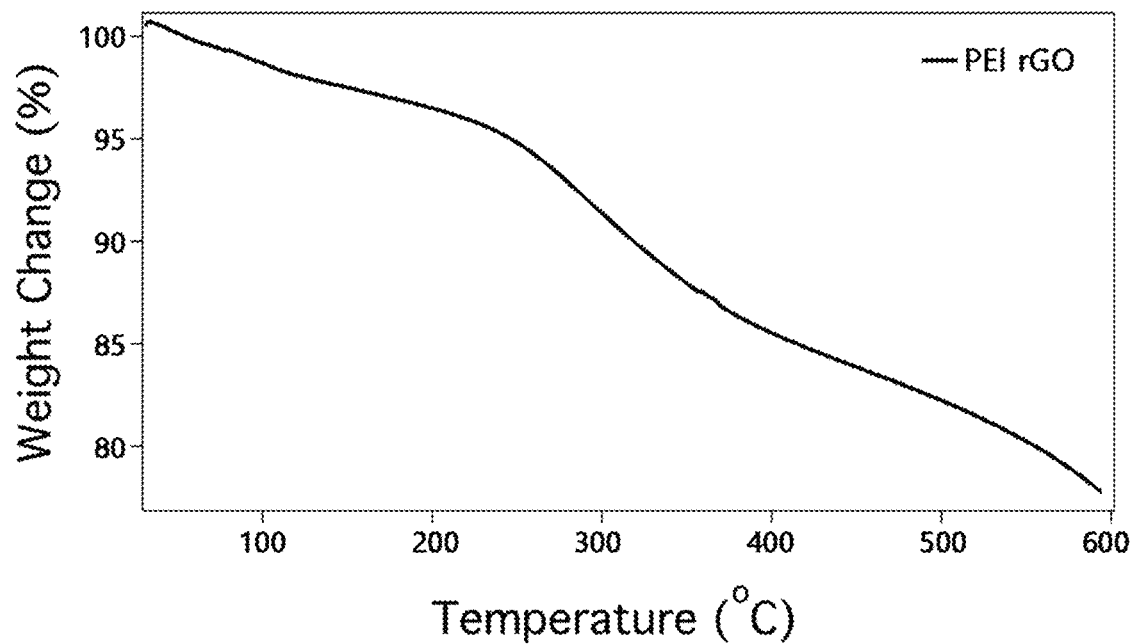
FIG. 7B shows a change in the weight of PEI by thermogravimetric analysis (TGA) of polyethyleneimine-bound rGO (PEIrGO) prepared in Example 2.

FIG. 7A shows a change in the weight of PEI by thermogravimetric analysis (TGA) of the PEI MWCNTs prepared in Example 1. FIG. 7B shows a change in the weight of PEI by thermogravimetric analysis (TGA) of the polyethyleneimine-bound rGO (PEIrGO) prepared in Example 2.

FIG. 7A reveals that the content of PEI in the PEI MWCNTs was ~1 wt %. In contrast, the weight of the PEI-free MWCNTs remained unchanged despite the change in temperature.

FIG. 7B reveals that the content of PEI in the PEIrGO was ~25 wt %.

Figure 8:
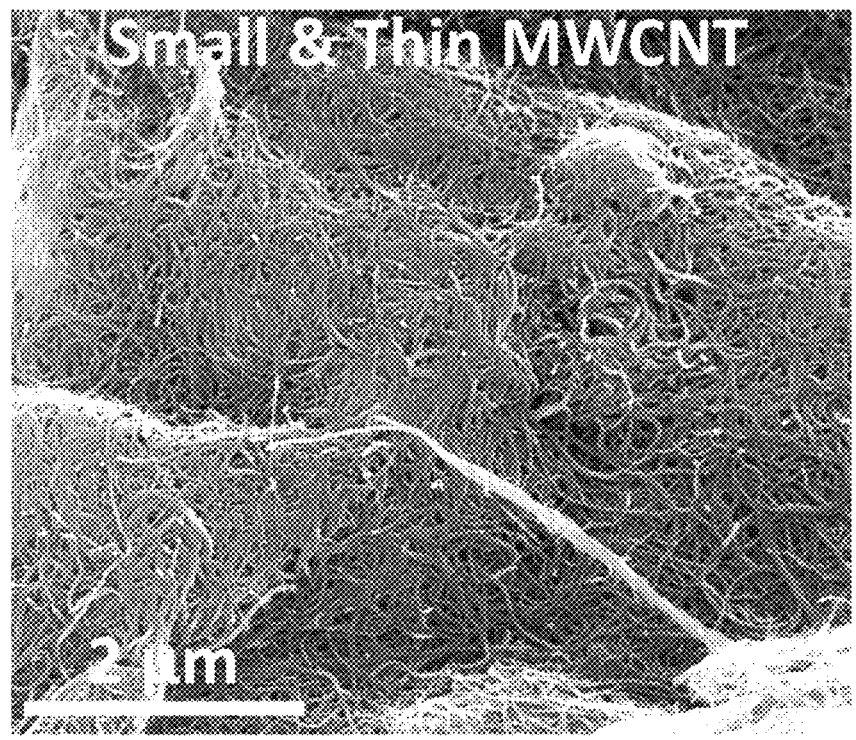
FIG. 8 is a scanning electron microscopy (SEM) image of MWCNTs (diameter: 9.5 nm, length: 1.5 μm) used in Comparative Example 2.

FIG. 8 is a scanning electron microscopy (SEM) image of the MWCNTs (diameter: 9.5 nm, length: 1.5 μm) used in Comparative Example 2.

An artificial solid electrolyte interphase based on the dense MWCNTs shown in FIG. 8 will deteriorate the electrochemical properties of a lithium metal battery due to the very small size of voids through which lithium can migrate across the artificial solid electrolyte interphase. That is, the presence of very small voids leads to an increase in surface resistance with increasing number of cycles. This explains better electrochemical properties of the carpet-like MWCNT structure with large voids shown in FIG. 2 (see FIG. 10).

Figure 9:
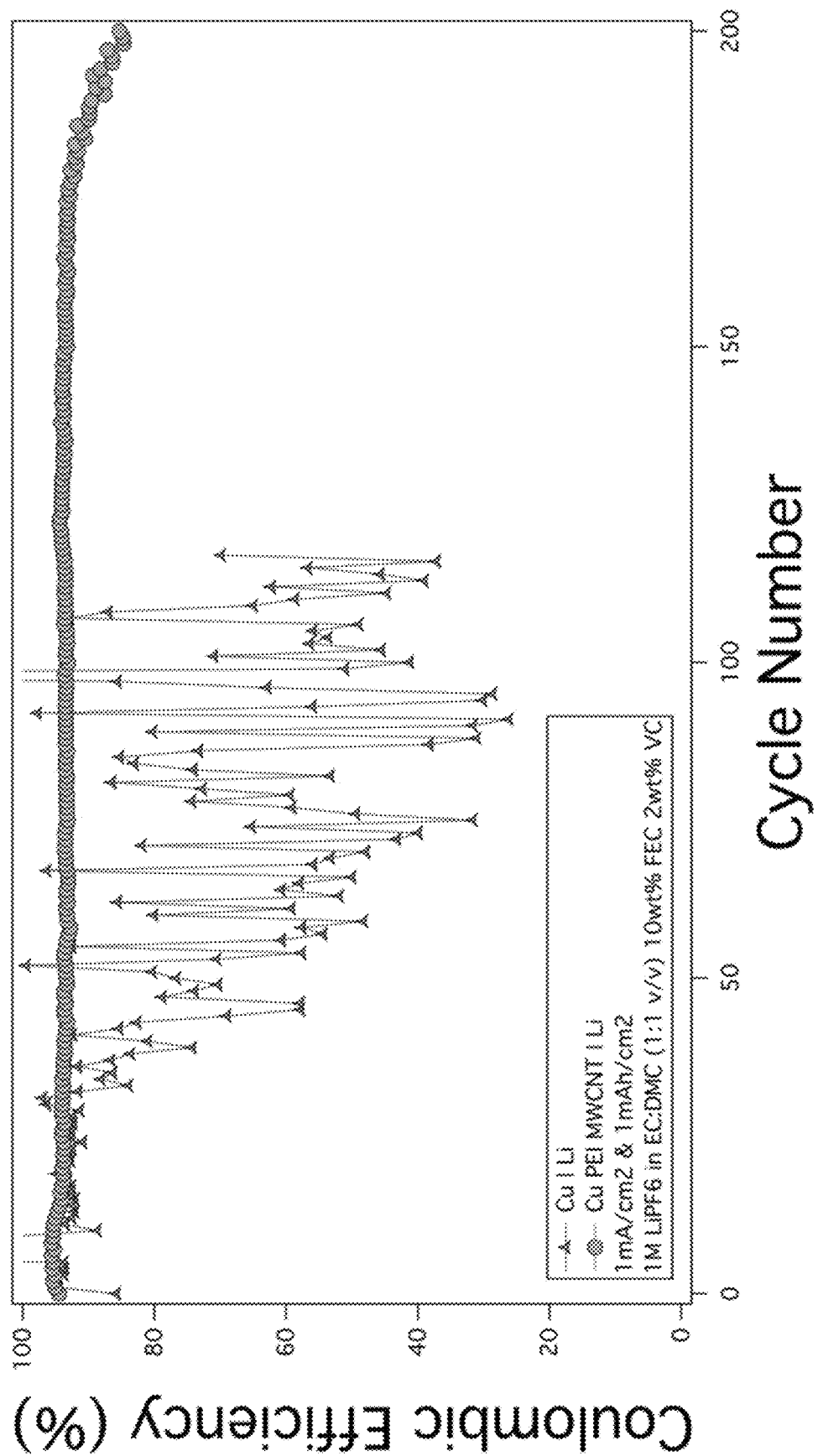
FIG. 9 shows the Coulombic efficiency of a lithium metal secondary battery using a copper foil coated with PEI MWCNTs prepared in Example 1 as a cathode and a lithium foil as an anode for lithium deposition and dissolution reactions when charged/discharged with a current density of 1 $mA/cm^2$ and a capacity of 1 $mAh/cm^2$.

FIG. 9 shows the Coulombic efficiency of a lithium metal secondary battery using a copper foil coated with the PEI MWCNTs prepared in Example 1 as a cathode and a lithium foil as an anode for lithium deposition and dissolution reactions when charged/discharged with a current density of 1 mA/cm$^2$ and a capacity of 1 mAh/cm$^2$.

Referring to FIG. 9, the Coulombic efficiency of a copper electrode without PEI MWCNTs was rapidly reduced after the 30$^{th}$ cycle whereas that of the copper electrode coated with the PEI MWCNTs was maintained at 90% of its initial value even after the 200$^{th}$ cycle.

Figure 10:
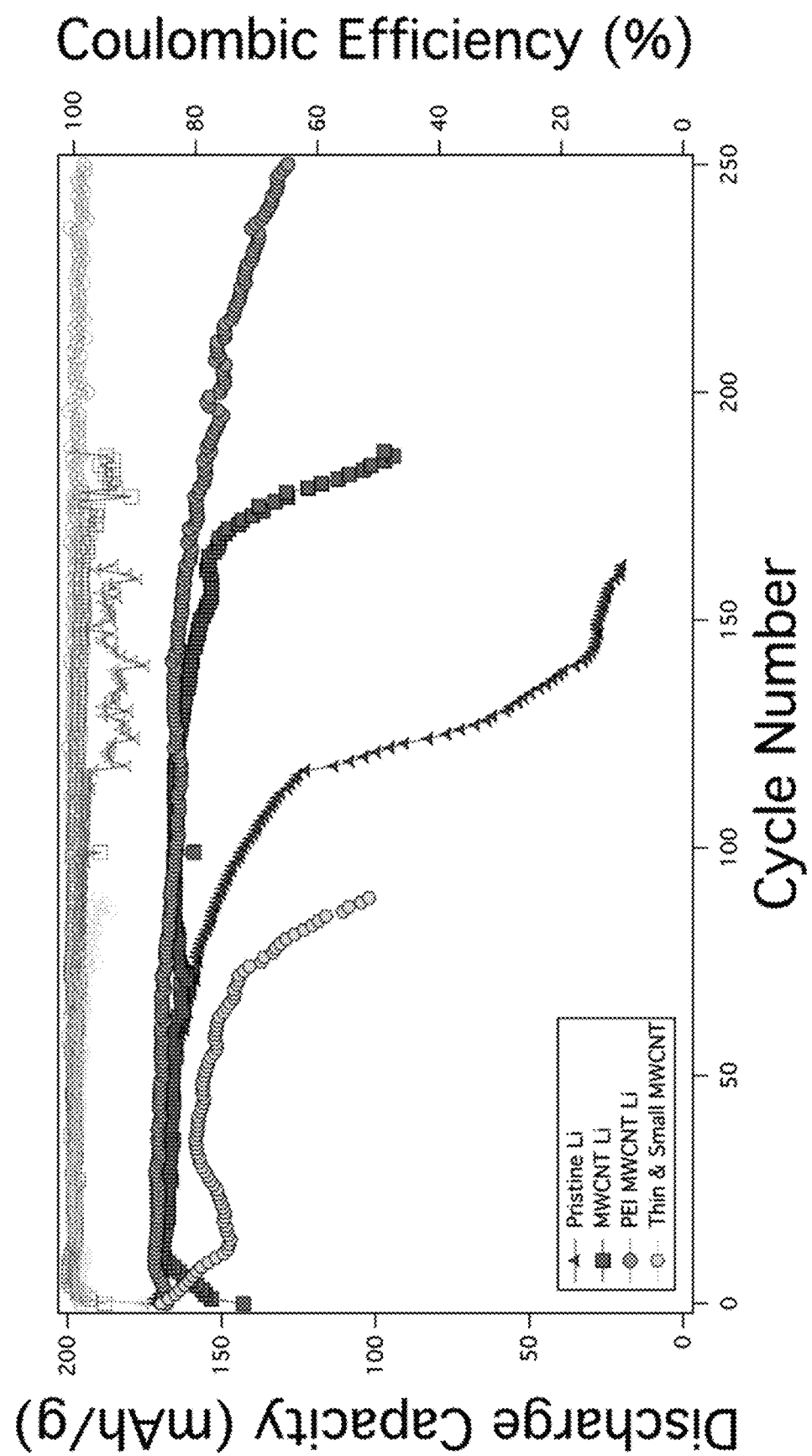
FIG. 10 shows cycle characteristics and charge/discharge efficiencies of a lithium metal secondary battery using a pristine lithium metal electrode of Comparative Example 1 ("Pristine Li") as an anode, a lithium metal secondary battery using an anode in which a thin film of MWCNTs used in Example 1 was formed on lithium metal ("MWCNT Li"), a lithium metal secondary battery using an anode in which a PEI MWCNT thin film prepared in Example 1 was formed on lithium metal ("PEI MWCNT Li"), and a lithium metal secondary battery using an anode in which a thin and small MWCNT thin film prepared in Comparative Example 2 was formed ("Thin & Small MWCNT")

FIG. 10 shows cycle characteristics and charge/discharge efficiencies of a lithium metal secondary battery using an NCM electrode plate as a cathode (see FIG. 12) and the pristine lithium metal electrode of Comparative Example 1 ("Pristine Li") as an anode, a lithium metal secondary battery using the anode in which the MWCNT thin film used in Example 1 was formed on lithium metal ("MWCNT Li"), a lithium metal secondary battery using the anode in which the PEI MWCNT thin film prepared in Example 1 was formed on lithium metal ("PEI MWCNT Li"), and a lithium metal secondary battery using the anode in which the thin and small MWCNT thin film prepared in Comparative Example 2 was formed ("Thin & Small MWCNT").

0.6 M LiTFSI, 0.4 M LiBOB, and 0.05 M LiPF$_6$ were added to a solution of EC and DMC (4:6 wt %) to prepare an electrolyte. Each of the anodes and the electrolyte were used to construct a cell. The cycle characteristics and charge/discharge efficiency of the cell were measured at 1 C.

Referring to FIG. 10, the life of the cell using the pristine lithium anode was only 100 cycles whereas the lives of the cells using the lithium anode coated with the MWCNTs and the lithium anode coated with the PEI MWCNTs were 170 cycles and >250 cycles, respectively. However, the cell using the anode coated with the thin and small MWCNTs shown in FIG. 8 showed a shorter cycle life than the cell using the pristine lithium anode. This result is believed to be due to the very small size of voids through which lithium can migrate across the SEI. That is, the presence of very small voids leads to an increase in the surface resistance of the anode, causing poor performance of the lithium metal secondary battery.

Figure 11:
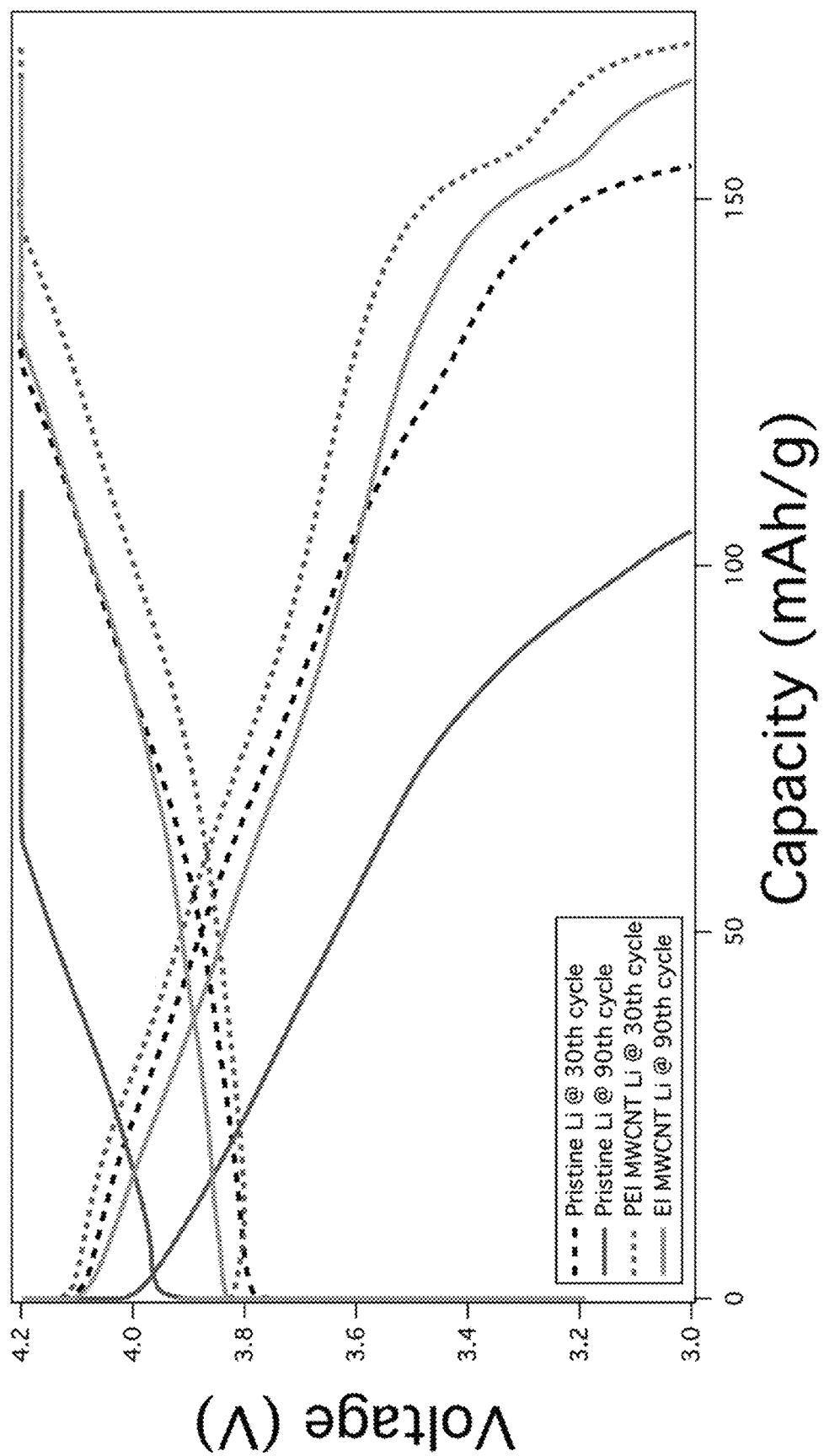
FIG. 11 shows voltage profiles of a lithium metal secondary battery using a pristine lithium metal electrode of Comparative Example 1 ("Pristine Li") as an anode and a lithium metal secondary battery using an anode in which a thin film of MWCNTs used in Example 1 was formed on lithium metal ("MWCNT Li") at the 30th and 90th cycles.

FIG. 11 shows voltage profiles of a lithium metal secondary battery using the pristine lithium metal electrode of Comparative Example 1 ("Pristine Li") as an anode and a lithium metal secondary battery using the anode in which the MWCNT thin film used in Example 1 was formed on lithium metal ("MWCNT Li") at the 30$^{th}$ and 90$^{th}$ cycles.

Referring to FIG. 11, the formation of dendrites in the pristine lithium anode led to SEI build-up, resulting in higher overvoltages at the 90$^{th}$ cycle than at the 30$^{th}$ cycle. In contrast, the overvoltages of the lithium metal of the lithium anode coated with the PEI MWCNTs were relatively well maintained. These results are attributed to the formation of a stable SEI that suppresses the growth of lithium dendrites, confirming that the surface resistance of lithium remained substantially unchanged despite the increased number of cycles.

Figure 12:
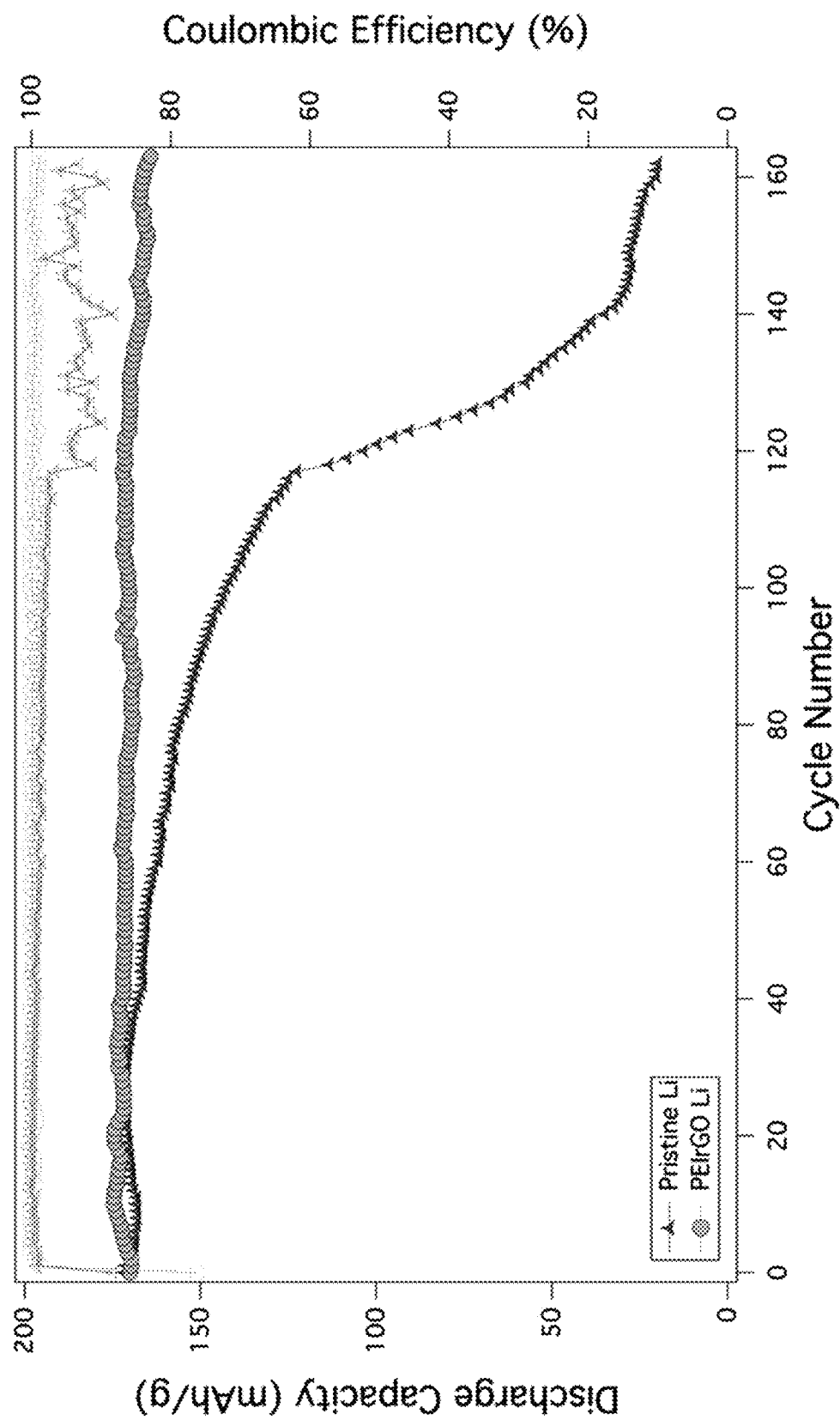
FIG. 12 shows cycle characteristics and charge/discharge efficiencies of a lithium metal secondary battery using an NCM electrode plate as a cathode and a pristine lithium metal electrode of Comparative Example 1 ("Pristine Li") as an anode and a lithium metal secondary battery using an NCM electrode plate as a cathode and a lithium metal electrode (PEIrGO Li) as an anode.

FIG. 12 shows cycle characteristics and charge/discharge efficiencies of the lithium metal secondary battery using an NCM electrode plate as a cathode and the pristine lithium metal electrode of Comparative Example 1 ("Pristine Li") as an anode and a lithium metal secondary battery using an NCM electrode plate as a cathode and the lithium metal electrode (PEIrGO Li) as an anode.

Each of the lithium metal secondary batteries was fabricated by the following procedure. First, a cathode plate was produced using LiNiCoMnO$_2$ (NCM) [8/1/1] as a three-component system. To this end, the synthesized sample (92%), a conductive material (4%), and a binder (4%) composed of polyvinylpyrrolidone (Mw ~360,000) (2%), polyethylene oxide (Mw ~1,000,000) (1%), sodium carboxymethyl cellulose (Mw ~250,000) (1%) were mixed in water to prepare a slurry. The slurry was coated on an aluminum foil using a doctor blade, dried in an oven at 80° C. for 1 day, and cut into a circular disc, which was used as a cathode. Pristine Li or PEIrGO Li was used as an anode and Celgard® 2500 was used as a separator. A solution of 0.6 M LiTFSI, 0.4 M LiF, 0.4 M LiBOB, and 0.05 M LiPF$_6$ in EC and DMC (4:6 wt %) was used as an electrolyte. The cathode active material NCM was loaded at a surface density of 18 mg/cm$^2$. The cathode, anode, separator, and electrolyte were assembled into a 2032 coin cell. The battery was subjected to a charge/discharge test at 1 C using a Maccor battery tester.

Referring to FIG. 12, the life of the cell using the pristine lithium anode was 100 cycles, whereas the life of the cell using the PEIrGO-coated lithium anode was >170 cycles.

Figure 13:
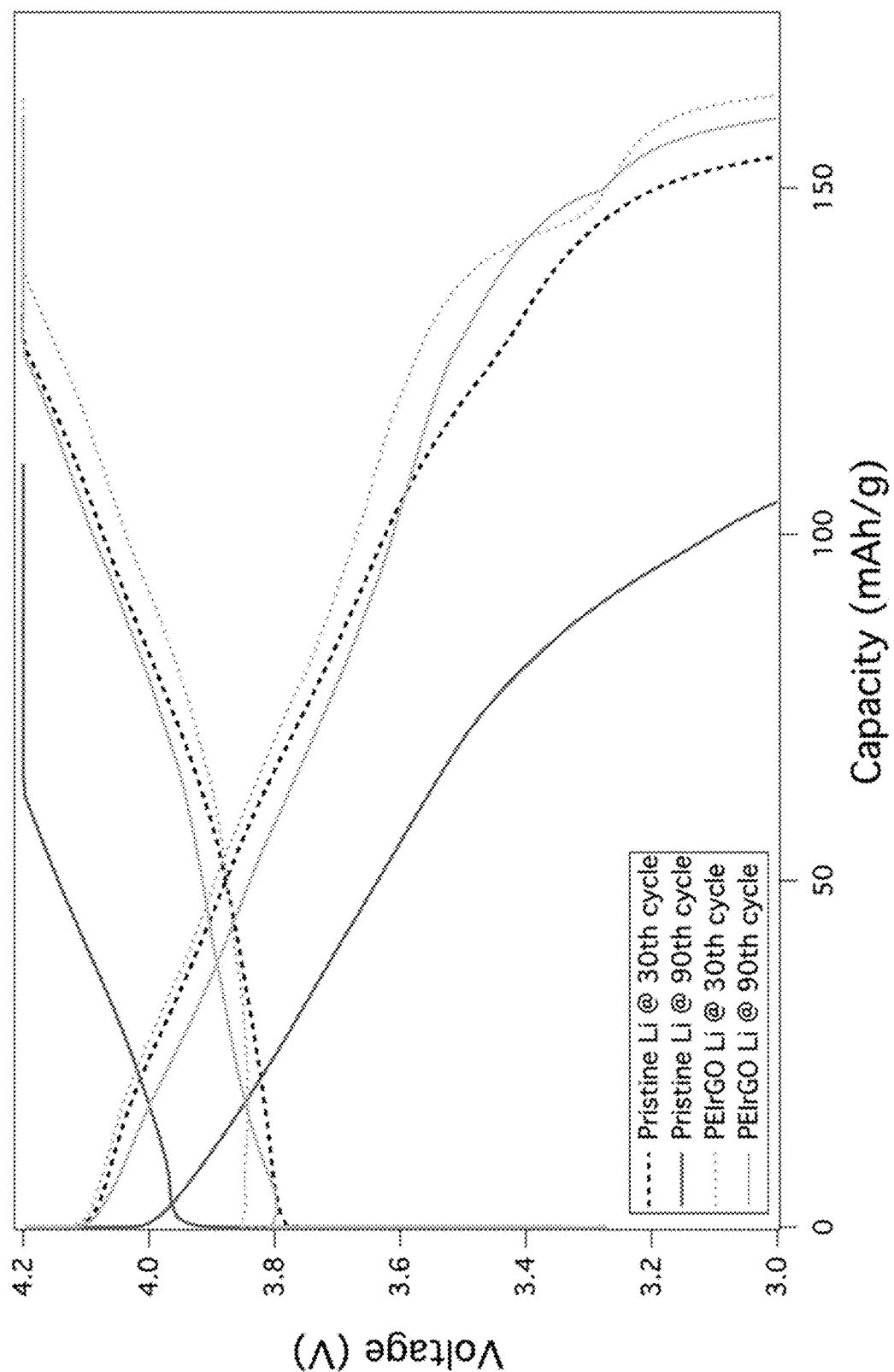
FIG. 13 shows voltage profiles of a lithium metal secondary battery using a pristine lithium metal electrode of Comparative Example 1 ("Pristine Li") as an anode and a lithium metal secondary battery using a lithium metal electrode (PEIrGO Li) as an anode at the 30th and 90th cycles.

FIG. 13 shows voltage profiles of a lithium metal secondary battery using the pristine lithium metal electrode of Comparative Example 1 ("Pristine Li") as an anode and a lithium metal secondary battery using the lithium metal electrode (PEIrGO Li) as an anode at the 30$^{th}$ and 90$^{th}$ cycles.

Referring to FIG. 13, the formation of dendrites in the pristine lithium anode led to SEI build-up, resulting in higher overvoltages at the 90$^{th}$ cycle than at the 30$^{th}$ cycle. In contrast, the overvoltages of the lithium metal anode coated with the PEIrGO were relatively well maintained. These results are attributed to the formation of a stable SEI that suppresses the growth of lithium dendrites, confirming that the surface resistance of lithium remained substantially unchanged despite the increased number of cycles.

In conclusion, the formation of the polyethyleneimine-attached amino-functionalized multi-walled carbon nanotube (PEI MWCNT) thin film or the polyethyleneimine-bound amino-functionalized reduced graphene oxide (PEIrGO) thin film on the lithium metal electrode in the anode of the present invention enables rapid diffusion and stable deposition of lithium to inhibit the formation of dendrites. In addition, the presence of the PEI MWCNT thin film or the PEIrGO thin film prevents side reactions between the lithium metal anode and the electrolyte in the lithium metal secondary battery of the present invention, achieving good electrochemical stability and high Coulombic efficiency of the lithium metal secondary battery.

What is claimed is:

1. An artificial solid electrolyte interphase (ASEI) of an anode for a secondary battery, comprising:
   a first film comprised of amino-functionalized, reduced graphene oxide (rGO) that is amino-functionalized by binding with polyethyleneimine present in an amount of from 1 to 50% by weight, based on total weight of the amino-functionalized, reduced graphene oxide (rGO) and that is disposed in contact with an anode material to protect the anode material; and
   a second film comprised of amino-functionalized, multi-walled carbon nanotubes that is amino-functionalized by binding with polyethyleneimine and that is stacked on the first film.

2. The artificial solid electrolyte interphase according to claim 1, wherein each multi-walled carbon nanotube of the amino-functionalized, multi-walled carbon nanotubes has a diameter ranging from 50 to 300 nm and a length ranging from 3 to 50 µm.

3. The artificial solid electrolyte interphase according to claim 1, wherein the second film is amino-functionalized by binding with from 0.1 to 10% by weight of polyethyleneimine, based on total weight of the amino-functionalized multi-walled carbon nanotubes.

4. An anode for a secondary battery, comprising:
   an anode material in the form of a foil; and
   an artificial solid electrolyte interphase (ASEI) provided on the anode material to protect the anode material and being comprised of:
   a first film comprised of amino-functionalized, reduced graphene oxide (rGO) that is amino-functionalized by binding with polyethyleneimine present in an amount of from 1 to 50% by weight, based on total weight of the amino-functionalized, reduced graphene oxide (rGO), and that is disposed in contact with the anode material; and
   a second film comprised of amino-functionalized, multi-walled carbon nanotubes that is amino-functionalized by binding with polyethyleneimine and that is stacked on the first film.

5. The anode for a secondary battery according to claim 4, wherein each multi-walled carbon nanotube of the amino-functionalized, multi-walled carbon nanotubes has a diameter ranging from 50 to 300 nm and a length ranging from 3 to 50 µm.

6. The anode for a secondary battery according to claim 4, wherein the second film is amino-functionalized by binding with polyethyleneimine present in an amount of 0.1 to 10% by weight, based on total weight of the amino-functionalized multi-walled carbon nanotubes.

7. A secondary battery comprising the anode according to claim 4.

8. The secondary battery according to claim 7, wherein the secondary battery is a lithium metal secondary battery wherein the anode is comprised of lithium metal.

9. The secondary battery according to claim 7, wherein the secondary battery has a cathode that comprises at least one compound selected from the group consisting of lithium cobalt oxides, lithium manganese oxides, lithium nickel cobalt aluminum oxides, lithium nickel manganese cobalt oxides, lithium iron phosphate oxide, and sulfur compounds, or is a porous air electrode.

10. An electric device, comprising the anode according to claim 4, wherein the electric device is selected from the group consisting of electric vehicles, hybrid electric vehicles, plug-in hybrid electric vehicles, and energy storage systems.

11. An artificial solid electrolyte interphase (ASEI) of an anode for a secondary battery, comprising:
    a plurality of first films, each first film being comprised of amino-functionalized, reduced graphene oxide (rGO) that is amino-functionalized by binding with polyethyleneimine present in an amount of from 1 to 50% by weight, based on total weight of the amino-functionalized, reduced graphene oxide (rGO), and one first film being disposed in contact with an anode material to protect the anode material, and the plurality of first films being stacked together as a three-dimensional network structure; and
    a second film comprised of amino-functionalized, multi-walled carbon nanotubes that is amino-functionalized by binding with polyethyleneimine, that has a three-dimensional structure, and that is stacked on an exposed first film of the plurality of first films.

12. The artificial solid electrolyte interphase according to claim 11, wherein each multi-walled carbon nanotube of the amino-functionalized, multi-walled carbon nanotubes has a diameter ranging from 50 to 300 nm and a length ranging from 3 to 50 µm.

13. The artificial solid electrolyte interphase according to claim 11, wherein the second film is amino-functionalized by binding with polyethyleneimine present in an amount of 0.1 to 10% by weight, based on total weight of the amino-functionalized multi-walled carbon nanotubes.

* * * * *